(12) United States Patent
Yu et al.

(10) Patent No.: US 10,581,770 B2
(45) Date of Patent: Mar. 3, 2020

(54) METHOD AND SYSTEM FOR COMMUNICATION IN INSTANT MESSAGING APPLICATION

(71) Applicant: Alibaba Group Holding Limited, George Town, Grand Cayman (KY)

(72) Inventors: Liying Yu, Hangzhou (CN); Chenlu Guo, Hangzhou (CN); Zhenhao Wu, Hangzhou (CN); Feng Luo, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 499 days.

(21) Appl. No.: 15/383,894

(22) Filed: Dec. 19, 2016

(65) Prior Publication Data
US 2017/0178094 A1 Jun. 22, 2017

(30) Foreign Application Priority Data

Dec. 21, 2015 (CN) .......................... 2015 1 0967580

(51) Int. Cl.
*G06Q 20/10* (2012.01)
*H04L 12/58* (2006.01)
*G06Q 20/32* (2012.01)

(52) U.S. Cl.
CPC ........... *H04L 51/046* (2013.01); *G06Q 20/10* (2013.01); *G06Q 20/3223* (2013.01);
(Continued)

(58) Field of Classification Search
CPC ....... H04L 51/046; H04L 51/08; H04L 51/10; H04L 51/38
See application file for complete search history.

(56) References Cited

U.S. PATENT DOCUMENTS 7,035,923 B1 4/2006 Yoakum
7,133,687 B1 11/2006 El-Fishawy
(Continued)

FOREIGN PATENT DOCUMENTS

JP 2011-59811 * 3/2011 ............ G06Q 10/06
JP 2014115716 6/2014
(Continued)

OTHER PUBLICATIONS

Gwynee, Guilford, "WeChat's little red envelopes are brilliant marketing for mobile payments," published on the internet at https://qz.com, on Jan. 29, 2014 (Year: 2014).*
(Continued)

*Primary Examiner* — Alexander G Kalinowski
*Assistant Examiner* — William B. Bunker
(74) *Attorney, Agent, or Firm* — Shun Yao; Park, Vaughan, Fleming & Dowler LLP

(57) ABSTRACT

Embodiments of the present application provide a method and system for for performing an allocation operation. During operation, the system may receive an object allocation request from a computing device associated with an allocation source. The system may determine the allocation source, one or more allocation targets, one or more notification targets, and a quantity of objects to be allocated based on the object allocation request. The system may extract objects to be allocated corresponding to the quantity of objects to be allocated from an object set corresponding to the allocation source. The system may then allocate the objects to be allocated to the allocation targets. The system may notify the notification targets of messages related to the allocation operation.

20 Claims, 15 Drawing Sheets

(52) U.S. Cl.
CPC ......... *G06Q 20/3255* (2013.01); *H04L 51/08* (2013.01); *H04L 51/10* (2013.01); *H04L 51/38* (2013.01)

(56) References Cited

U.S. PATENT DOCUMENTS

| | | | |
|---|---|---|---|
| 7,197,122 B2 | 3/2007 | Vuori | |
| 7,398,252 B2* | 7/2008 | Neofytides | G06Q 20/02 283/58 |
| 7,603,413 B1 | 10/2009 | Herold | |
| 7,653,691 B2 | 1/2010 | Lasensky | |
| 7,835,955 B1 | 11/2010 | Brodsky | |
| 8,165,609 B2 | 4/2012 | Fang | |
| 8,316,096 B2 | 11/2012 | Svendsen | |
| 8,355,699 B1 | 1/2013 | Lo | |
| 8,548,865 B1 | 10/2013 | Ho | |
| 8,670,791 B2 | 3/2014 | Ye | |
| 8,768,310 B1 | 7/2014 | Oroskar | |
| 8,769,022 B2 | 7/2014 | Tivyan | |
| 8,788,602 B1 | 7/2014 | Wan | |
| 8,843,117 B2 | 9/2014 | Sigmund | |
| 8,856,244 B2 | 10/2014 | Madnani | |
| 8,880,725 B2 | 11/2014 | Ananthanarayanan | |
| 8,968,103 B2 | 3/2015 | Zhou | |
| 9,021,040 B1 | 4/2015 | Andrews | |
| 9,117,197 B1 | 8/2015 | Sharma | |
| 9,143,477 B2 | 9/2015 | Murthy | |
| 9,185,062 B1 | 11/2015 | Yang | |
| 9,230,244 B2 | 1/2016 | Patil | |
| 9,253,639 B1 | 2/2016 | Lafuente | |
| 10,021,203 B2* | 7/2018 | Papakipos | G06Q 10/10 |
| 2002/0016163 A1 | 2/2002 | Burgan | |
| 2002/0120453 A1 | 8/2002 | Lee | |
| 2003/0084109 A1 | 5/2003 | Balluff | |
| 2003/0135559 A1 | 7/2003 | Bellotti | |
| 2003/0154249 A1 | 8/2003 | Crockett | |
| 2004/0002932 A1 | 1/2004 | Horvitz | |
| 2004/0006599 A1 | 1/2004 | Bates | |
| 2004/0102962 A1 | 5/2004 | Wei | |
| 2005/0149855 A1 | 7/2005 | Loo | |
| 2006/0093142 A1 | 5/2006 | Schneier | |
| 2006/0229890 A1* | 10/2006 | Sattler | G06Q 10/105 705/7.11 |
| 2007/0060193 A1 | 3/2007 | Kim | |
| 2007/0299565 A1 | 12/2007 | Oesterling | |
| 2008/0112596 A1 | 5/2008 | Rhoads | |
| 2008/0114776 A1 | 5/2008 | Sun | |
| 2008/0307040 A1 | 12/2008 | So | |
| 2008/0307094 A1 | 12/2008 | Karonen | |
| 2009/0018903 A1 | 1/2009 | Iyer | |
| 2009/0240497 A1 | 9/2009 | Usher | |
| 2009/0287776 A1 | 11/2009 | Corry | |
| 2010/0005402 A1 | 1/2010 | George | |
| 2010/0023341 A1 | 1/2010 | Ledbetter | |
| 2010/0056109 A1 | 3/2010 | Wilson | |
| 2010/0205541 A1 | 8/2010 | Rapaport | |
| 2010/0323752 A1 | 12/2010 | Park | |
| 2011/0019662 A1 | 1/2011 | Katis | |
| 2011/0035687 A1 | 2/2011 | Katis | |
| 2011/0136431 A1 | 6/2011 | Haaramo | |
| 2011/0173041 A1 | 7/2011 | Breitenbach | |
| 2011/0173548 A1 | 7/2011 | Madnani | |
| 2011/0243113 A1 | 10/2011 | Hjelm | |
| 2012/0030301 A1 | 2/2012 | Herold | |
| 2012/0059842 A1 | 3/2012 | Hille-Doering | |
| 2012/0108268 A1 | 5/2012 | Lau | |
| 2012/0185547 A1 | 7/2012 | Hugg | |
| 2013/0080580 A1 | 3/2013 | Nagai | |
| 2013/0086071 A1 | 4/2013 | Riedel | |
| 2013/0133055 A1 | 5/2013 | Ali | |
| 2013/0138726 A1 | 5/2013 | Shin | |
| 2013/0144702 A1 | 6/2013 | Tabor | |
| 2013/0173723 A1 | 7/2013 | Herold | |
| 2013/0227029 A1 | 8/2013 | Hymel | |
| 2013/0227041 A1 | 8/2013 | Rideout | |
| 2013/0268418 A1 | 10/2013 | Sardi | |
| 2013/0268765 A1 | 10/2013 | Kent, Jr. | |
| 2013/0297493 A1* | 11/2013 | Linden | G06Q 20/28 705/39 |
| 2013/0298006 A1 | 11/2013 | Good | |
| 2013/0311920 A1 | 11/2013 | Koo | |
| 2013/0332162 A1 | 12/2013 | Keen | |
| 2013/0332307 A1* | 12/2013 | Linden | G06Q 30/0631 705/26.7 |
| 2014/0025546 A1 | 1/2014 | Seng | |
| 2014/0164073 A1* | 6/2014 | Mosley | G06Q 10/06398 705/7.42 |
| 2014/0191986 A1 | 7/2014 | Kim | |
| 2014/0207659 A1* | 7/2014 | Erez | G06Q 30/0633 705/39 |
| 2014/0279315 A1* | 9/2014 | Courter | G06Q 40/125 705/30 |
| 2014/0280615 A1 | 9/2014 | Burlin | |
| 2014/0331150 A1 | 11/2014 | Griffin | |
| 2014/0372516 A1 | 12/2014 | Watte | |
| 2015/0039708 A1* | 2/2015 | Liu | H04L 51/24 709/206 |
| 2015/0081486 A1 | 3/2015 | Niazi | |
| 2015/0170104 A1 | 6/2015 | Yamada | |
| 2015/0207926 A1 | 7/2015 | Brown | |
| 2015/0256353 A1 | 9/2015 | Busey | |
| 2015/0264303 A1 | 9/2015 | Chastney | |
| 2015/0296450 A1 | 10/2015 | Koo | |
| 2015/0310567 A1* | 10/2015 | Wu | G06Q 50/01 705/26.5 |
| 2015/0317590 A1 | 11/2015 | Karlson | |
| 2015/0350130 A1 | 12/2015 | Yang | |
| 2015/0350225 A1 | 12/2015 | Perold | |
| 2016/0055215 A1 | 2/2016 | Kauwe | |
| 2016/0062574 A1 | 3/2016 | Anzures | |
| 2016/0094509 A1 | 3/2016 | Ye | |
| 2016/0125363 A1 | 5/2016 | Hung | |
| 2016/0132971 A1 | 5/2016 | Teh | |
| 2016/0227019 A1 | 8/2016 | Seol | |
| 2016/0242007 A1 | 8/2016 | Mihara | |
| 2017/0041255 A1 | 2/2017 | Dong | |
| 2017/0118147 A1* | 4/2017 | Dold | H04L 51/046 |
| 2017/0142212 A1 | 5/2017 | Bifulco | |
| 2017/0171135 A1 | 6/2017 | Wu | |
| 2017/0185965 A1 | 6/2017 | Nishizawa | |
| 2017/0228699 A1 | 8/2017 | Pang | |

FOREIGN PATENT DOCUMENTS

| | | |
|---|---|---|
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 15113458 A1 | 8/2015 |
| WO | 2015113458 | 8/2015 |
| WO | 2016016248 | 2/2016 |
| WO | 2016050146 | 4/2016 |
| WO | 2016054629 | 4/2016 |

OTHER PUBLICATIONS

Anonymous, "Crowdsource Your Company's Bonuses," I Done This Blog, www.blog.idonethis.com, May 30, 2012 (Year: 2012).*

Hao Yunhong, Qian Chen, "Decentralization and Compensation Reforms in China: The Case of Xiaoshan InterTrade," 2008 ISECS International Colloquium on Computing, Communication, Control and Management, IEEE Computer Society (Year: 2008).*

Ozimec et al., "Moticational Inventives for developing salesforce performance in emerging markets," University of Zagreb, Croatia, IEEE (Year: 2011).*

Jon Russel, "Messaging app WeChat is becoming a mobile payment giant in China", posted Mar. 17, 2016.

(56) References Cited

OTHER PUBLICATIONS

"WeChat red envelope" from Wikipedia, the free encyclopedia, downloaded Dec. 16, 2016.

* cited by examiner

METHOD AND SYSTEM FOR COMMUNICATION IN INSTANT MESSAGING APPLICATION

RELATED APPLICATION

Under 35 U.S.C. 119, this application claims the benefits and rights of priority of Chinese Patent Application No. 201510967580.6, filed 21 Dec. 2015.

BACKGROUND

Field

The present invention relates to instant messaging technology, and particularly relates to a method and system for providing gift objects to one or more members of a group while notifying others of the allocation.

Related Art

With the development of network technology, there emerges a variety of approaches for sending monetary gifts or other objects. For example, one can send money using a gift function in a software application. A gift function may be a virtual product designed to resemble the act of offering real gifts.

SUMMARY

One embodiment of the present disclosure provides a system for performing an allocation operation. During operation, the system may receive an object allocation request from a computing device associated with an allocation source. The system may determine the allocation source, one or more allocation targets, one or more notification targets, and a quantity of objects to be allocated based on the object allocation request. The system may extract objects to be allocated corresponding to the quantity of objects to be allocated from an object set corresponding to the allocation source. The system may then allocate the objects to be allocated to the allocation targets. The system may notify the notification targets of messages related to the allocation operation.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Figure 1:
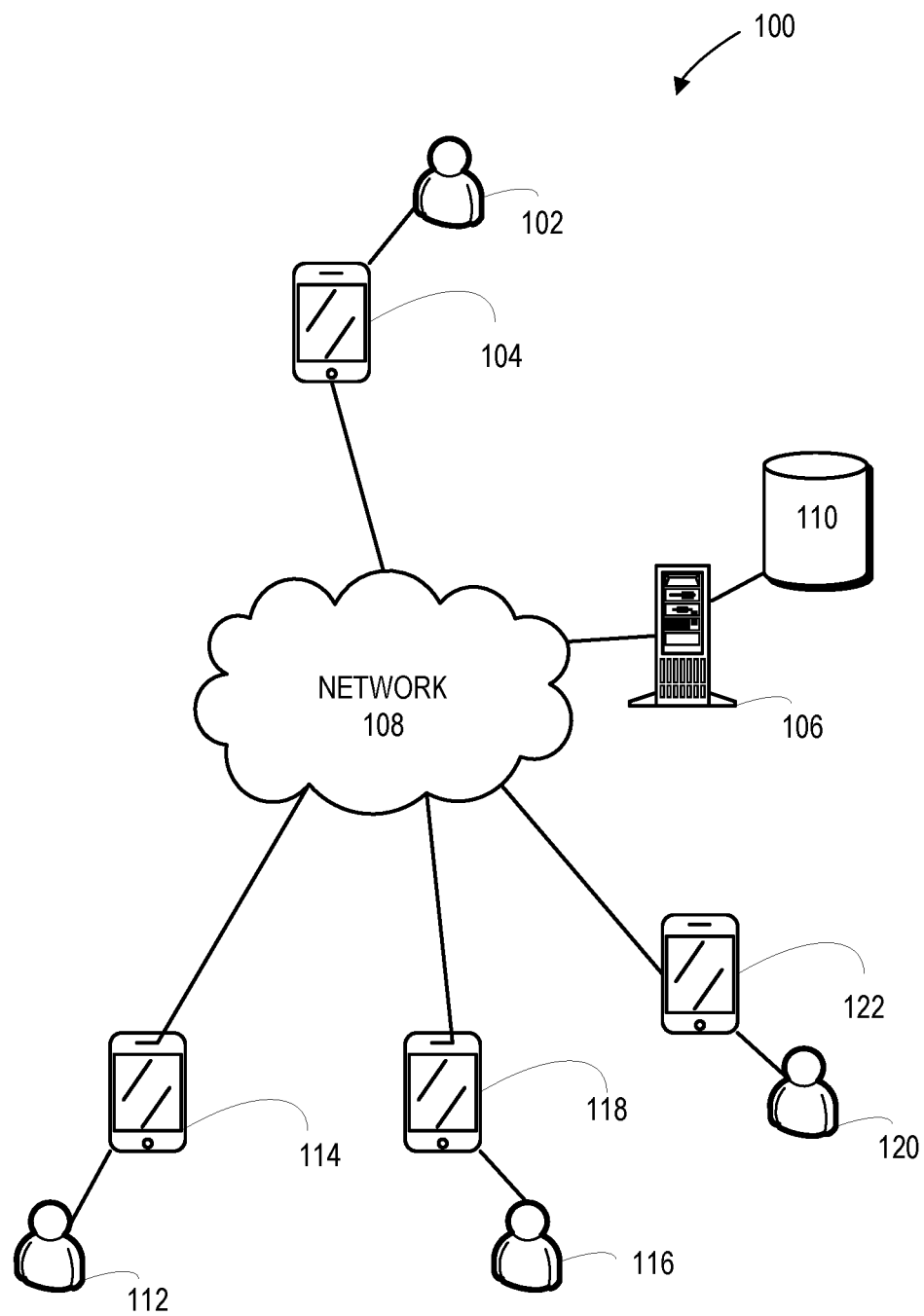
FIG. 1 presents a schematic diagram of an exemplary computing system that facilitates an object allocation process, in accordance with an embodiment of the present invention.

Embodiments of the present invention solve the problem of offering a gift object to one or more specific users in a group chat session by allowing a user's computing device to send to a server an object allocation request that specifies allocation targets, notification targets, and a quantity of objects (e.g., a number of reward or gift objects) to be allocated. The user is called an allocation source. Allocation targets are other users that receive portions of the gift object. Notification targets are users that receive information regarding the offered gift objects without actually receiving the rewards, which facilitates motivating the notification targets. The allocation source, allocation targets, and notification targets may all be members of a group in an organization. The "gift objects," or simply "objects," can be monetary funds, such as lucky money, traditional Chinese "red envelop" monetary gift, gift cards, or any type of reward or bonus that can be transferred from one user to another. In an object allocation system, the server may extract objects to be allocated from an object set and allocate the objects accordingly among the allocation targets. For example, the server may extract funds from a business account and allocate the money to specific members of the group. The server may also notify the notification targets of the allocation. For example, the server may notify group members who do not receive any allocated funds that money is being allocated to other members of the group.

Sending Gift Objects in Organizations

A business organization may allow a user to send a gift object, and the gift object may indicate specifically that the user sends funds or other items (e.g., virtual goods, coupons) etc. to other users. In an enterprise scenario, a manager, financial staff, or other authorized staff members may access a fund account and send a gift object with funds or other virtual goods. The account may be, for example, an individual account of a user (e.g., a personal bank account), a public fund account, or an enterprise fund account.

When sending a gift object, in various application scenarios, one may send the gift object either to an individual or to all members in a group. In some application scenarios a user may desire to send a gift object to some members of a team. Existing technologies only allow the sender to send to each team member individually and separately. However, the sender may sometimes wish to allow other team members to know of the gift object being awarded to certain user(s). If the sender sends the gift object to the entire team, then all members in the team may click on and receive the gift object, and the sender cannot effectively control who may receive the contents of the gift object. With embodiments of the present invention, the sender may choose to send the gift object to one or more specific group members while allowing other members of the same group to observe the transfer of the gift object without receiving the gift object. This configuration can be useful in a corporate environment, where a public award to certain members of a group can serve to motivate other members in the same group.

Computing System for Allocating Objects

FIG. 1 presents a schematic diagram of an exemplary computing system 100 that facilitates an object allocation process, in accordance with an embodiment of the present invention. As illustrated in FIG. 1, a user 102 may be operating a client computing device 104 with installed modules that allows user 102 to participate in instant messaging, as well as send and receive gift objects. When user 102 allocates objects (e.g., sends reward or bonus money) to other parties, user 102 is an allocation source. Computing device 104 may be a mobile device such as a mobile phone, a tablet, or a laptop, a desktop computer, or any other type of computing device. User 102 may represent, for example, a member of a group in a business organization. Computing device 104 may communicate with a server 106 over a network 108. Server 106 may represent an enterprise server that allows users to send instant messages, as well as send and receive gift objects. Server 106 may include a storage 110 for storing code for various applications and other data, such as code for object allocation software, user data, and object data (e.g., including funds or other virtual objects). Storage 110 may also store code for the modules described herein, such as code for a determining module that determines an allocation source, allocation targets, notification targets, and a quantity of objects (e.g., a number of objects) to be allocated based on an object allocation request. Further, server 106 may represent a cluster of machines supporting functions of the enterprise server.

User 112 may operate a client 114, user 116 may operate a client 118, and user 120 may operate a client 122. For example, user 112 may operate client 114 to connect to server 106, and receive and send instant messages with other users operating other computing devices, as well as send and receive gift objects. User 112 can use client 114 to conduct instant messaging with other parties, such as user 102. User 112 can also use client 114 to interact with server 106 and allocate objects to other allocation targets, as well as receive objects allocated by other parties. Note that each of clients 114, 118, 122 may be a mobile device such as a mobile phone, a tablet, or a laptop, a desktop computer, or any other type of computing device.

In some embodiments, a computing device can send a request for customized executable code that when installed allows for instant messaging, object allocation, and/or interacting with server 106. The client can receive the executable code from server 106 and then install the executable code to enable instant messaging, object allocation, and other interaction with server 106. Further, server 106 can automatically update the executable code. Server 106 may push software updates automatically to clients.

In some embodiments, a client and/or server 106 can also interact directly with banks and other online merchants to obtain information that an allocation source may use for allocating objects. For example, computing device 104 may retrieve business account information from a bank so that the allocation source may view and allocate funds accordingly. Computing device 104 may also pull other merchant data to allow an allocation source to select different objects (e.g., merchant products) and allocate the objects to allocation targets. Computing device 104 may integrate the bank and/or merchant data into a common user interface and present the information from the bank and/or merchant data within a consistent, integrated user interface to a user.

In some embodiments, the computing devices associated with the instant messaging and object allocation processes can be implemented using a peer-to-peer architecture.

Embodiments of the present invention represent an improvement over existing systems. A computing device associated with an allocation source has the additional capability of allocating objects (e.g. funds) to other computing devices associated with group members. The computing device may communicate with a server to allocate and notify other members of the allocation. The computing device allows the allocation source to allocate only to a subset of group members, and notify the members that do not receive an allocation of the allocation operation.

In some embodiments, a computing device (e.g. a client device and/or server) may generate a data structure and store data representing the data structure in memory and/or non-transitory storage. The computing device may store in the data structure data such as information associated with (e.g., describing or indicating) the group members, allocation source, allocation targets, notification targets, quantity of objects to be allocated, and/or account information. The computing device may also store in data structures the Internet Protocol addresses (IP addresses) of other computing devices, IP address of a server, and/or data associated with a peer-to-peer implementation. The computing device may access the data structures to extract stored information, such as during allocation processing, thereby speeding up processing time in object allocation application scenarios. The computing device may re-access the data stored in the data structures when processing future object allocations to reduce the time for allocating objects in various application scenarios. In some embodiments, the computing device may cache data associated with the data structures and access the cached data, thereby reducing processing time in some application scenarios.

Note that the techniques discussed in the present disclosure represent an improvement in various technology areas such as human-machine interaction, user interfaces, enterprise software, human resource management software, and communication software.

Process for Allocating Objects

Figure 2:
FIG. 2 presents a flowchart illustrating an exemplary process for allocating objects, in accordance with an embodiment of the present invention.

FIG. 2 presents a flowchart illustrating an exemplary process 200 for allocating objects, in accordance with an embodiment of the present invention. A server may perform the operations depicted in FIG. 2. During operation, the system may initially receive an object allocation request from a computing device associated with an allocation source (operation 202). The system may receive the object allocation request over a network from the computing device.

The system may determine the allocation source, allocation targets, notification targets and a quantity of objects to be allocated based on a received object allocation request (operation 204). The objects may be funds or other items used to reward group members.

The system may extract the objects to be allocated corresponding to the quantity of objects to be allocated from an object set corresponding to the allocation source (operation 206).

The system may allocate the objects to be allocated to the allocation targets, and notify notification targets of messages related to the allocation operation (operation 208).

1. Determining Allocation Information

In operation 204, the system may perform various techniques to determine information associated with the allocation source, the allocation targets, the notification targets and the quantity of objects to be allocated. One method for determining the information is described below.

Embodiment I

In an embodiment, the server may determine that a sender of the object allocation request is the allocation source, and extract data indicating the allocation targets and the quantity of objects to be allocated from the object allocation request. In other words, the allocation source specifies in advance the allocation targets and the quantity of objects to be allocated.

As an example, the allocation source may specify the allocation targets and the quantity of objects to be allocated in advance using a certain application program installed on an electronic device. The application program may be an instant messaging application. For example, the instant messaging application may be an enterprise instant messaging (EIM) application. One such EIM application is "Ding Talk".

When the allocation source sends the object allocation request through a message session window of a communication group, such as in "Ding Talk", the system may specify the corresponding allocation targets and the quantity of objects to be allocated. The system may automatically determine the notification targets based on characteristics of the group.

Message Session Window and Menu Options

Figure 3:
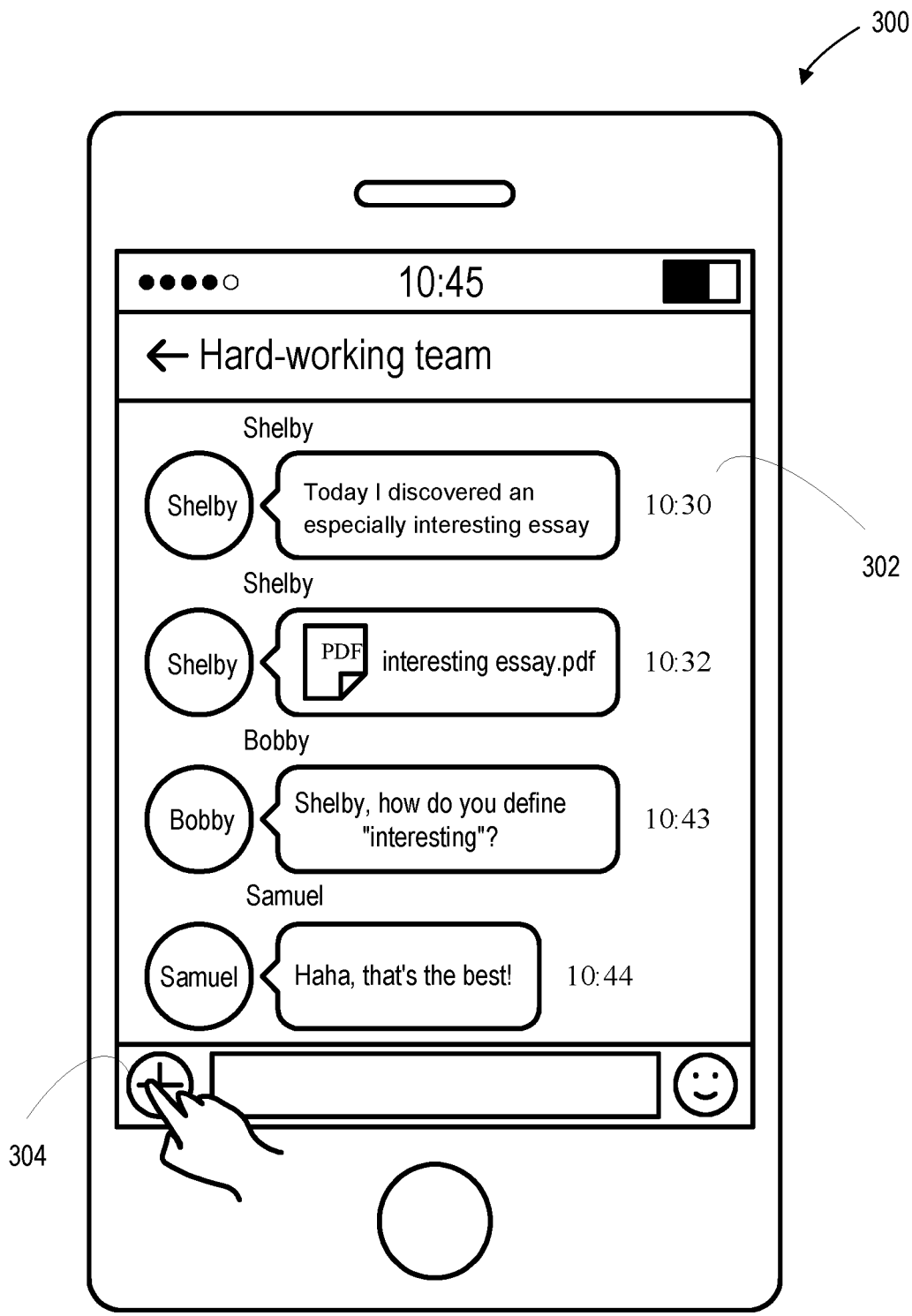
FIG. 3 presents a schematic diagram illustrating an exemplary message session window, in accordance with an embodiment of the present invention.

FIG. 3 presents a schematic diagram 300 illustrating an exemplary message session window 302, in accordance with an embodiment of the present invention. As illustrated in FIG. 3, an allocation source may perform an operation in message session window 302 corresponding to a "hard-working team" group. For example, the user may click on a "⊕" icon 304 on the lower left corner of the message session window illustrated in FIG. 3 to call out menu options on the bottom of the message session window. These menu options may be as illustrated in FIG. 4.

Figure 4:
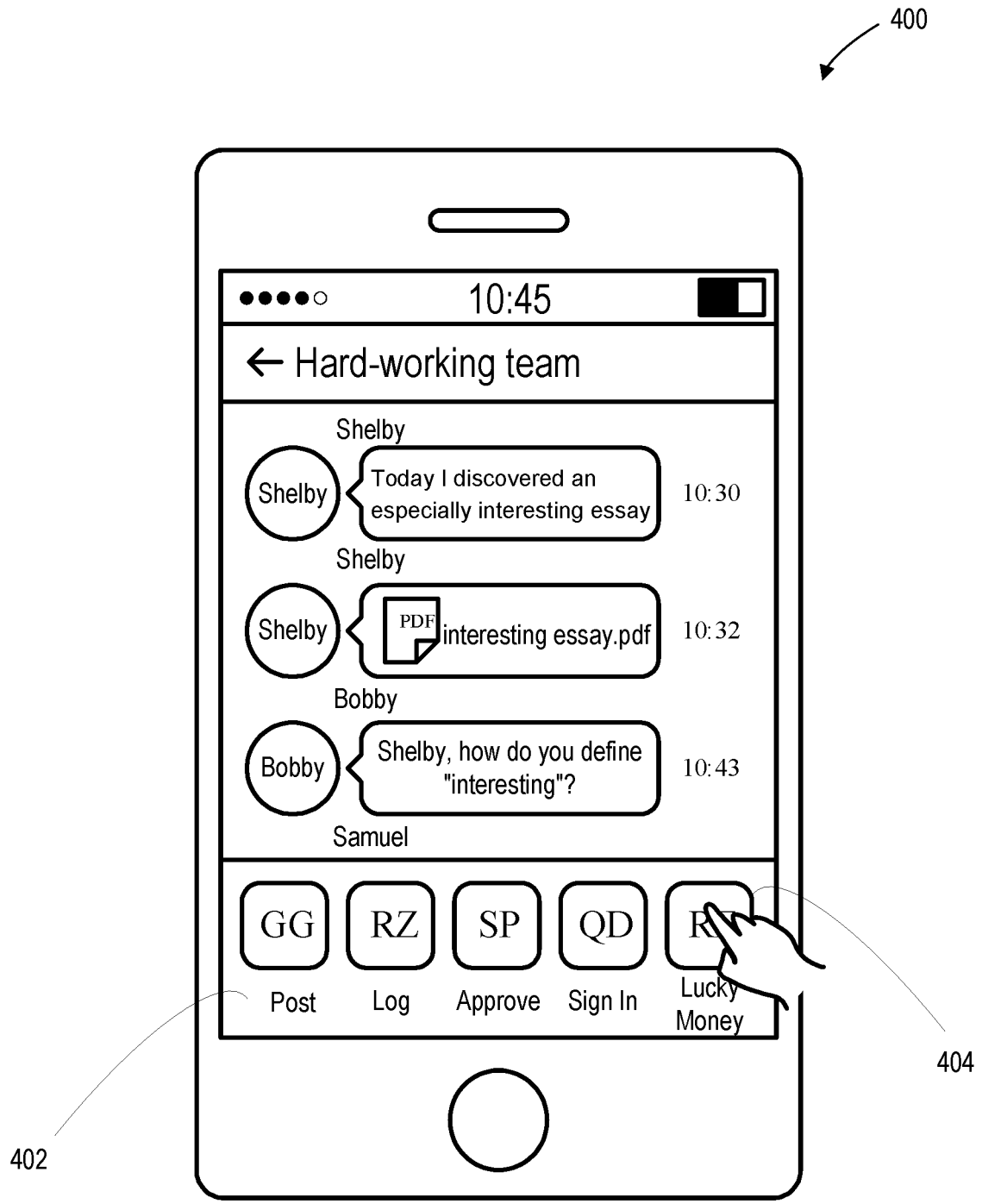
FIG. 4 presents a schematic diagram illustrating an exemplary application screen with menu options, in accordance with an embodiment of the present invention.

FIG. 4 presents a schematic diagram 400 illustrating an exemplary application screen with menu options, in accordance with an embodiment of the present invention. As depicted in FIG. 4, the menu options may include control buttons 402 for enterprise management, such as the control buttons labeled "post", "log", "approve", and "sign in". Control buttons 402 may also include a control button 404 labeled "lucky money" for sending lucky money and/or other gift objects.

Gift Object Configuration Page

Figure 5:
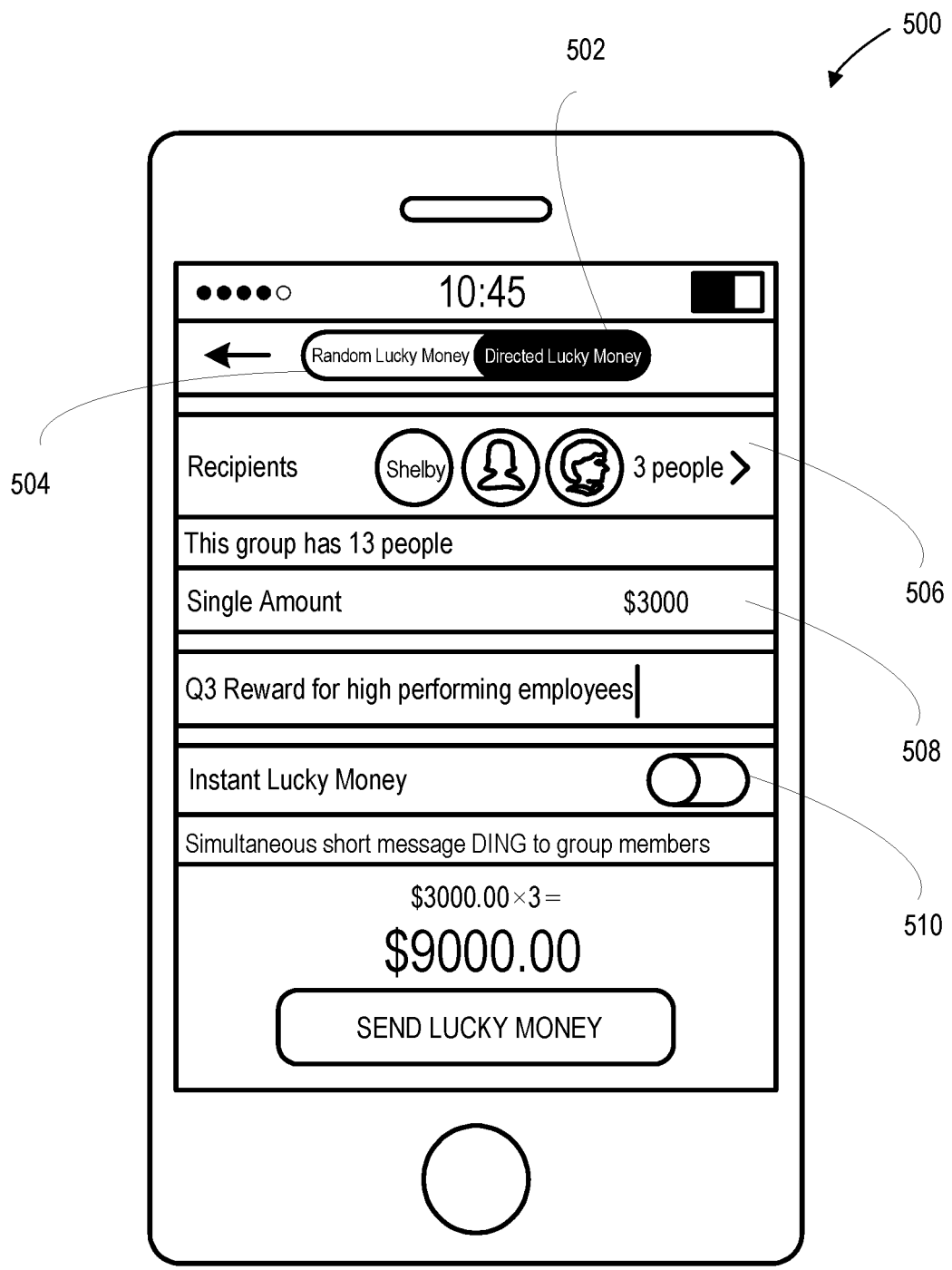
FIG. 5 presents a schematic diagram illustrating an exemplary gift object configuration page, in accordance with an embodiment of the present invention.

FIG. 5 presents a schematic diagram 500 illustrating an exemplary gift object configuration page, in accordance with an embodiment of the present invention. After an allocation source selects the control button 404 labeled "lucky money" in FIG. 4, the system may change the application screen to the gift object (e.g., "lucky money") configuration page displayed in FIG. 5.

The allocation source may choose to use either directed lucky money 502 or random lucky money 504 for sending lucky money. With directed lucky money, in a group scenario with multiple members, the allocation source may indicate specifically which members of the group receive a lucky money allocation. In contrast, random lucky money does not allow the allocation source to specifically indicate which group members will receive the lucky money. Instead, all members in the group are indicated as receiving a lucky money allocation.

As shown in FIG. 5, recipients 506 are users who are the allocation targets. The allocation source may select group members as the recipients from all members in the "hard-working team". For example, in FIG. 5, there are total of 13 people in the group labeled "hard-working team", but the allocation source selects three members as recipients. When the allocation source selects three people as allocation targets from a total of 13 people in the group labeled "hard-working team", the server may automatically determine the nine other group members (besides the allocation source and the three allocation targets) to be the notification targets.

Also, a configuration form 508 labeled "single amount" illustrated in FIG. 5 allows the allocation source to specify the quantity of objects allocated to each allocation target. In FIG. 5, the quantity of total objects to be allocated is $3000*3=$9000.

If the allocation source selects an instant lucky money control 510 on the lucky money configuration page, the system may perform a message notification operation with respect to "simultaneous short message DING to group members". The "simultaneous short message DING to group members" text display indicates that the system performs message notification by sending a short message. The short message may be a Short Message Service (SMS) message, which is also referred to as a text message, and may also be a multimedia messaging service (MMS) message. Similarly, the allocation source may also select "telephone DING" or "in-application DING" (not illustrated) to execute message notification operations using telephone or instant messaging methods.

The system may apply the selected instant lucky money option to an object allocation process, e.g., lucky money sending process. For example, after the allocation source selects instant lucky money control 510 based on "simultaneous short message DING to group members" illustrated in FIG. 5 or FIG. 6, the server may notify the notification targets via short message. The server may also send short messages to the allocation targets. The short message may describe the details of the lucky money being sent and a method for receiving the lucky money. When the server receives short message replies from the allocation targets according to the indicated lucky money receiving method, the server may allocate the lucky money or other objects to the allocation targets.

FIG. 5 illustrates an application screen in which objects being sent are funds. The funds may be sourced from an account corresponding to the allocation source (e.g., object set). In other application scenarios, the objects and the object set may also be of other forms, which are not limited to the examples disclosed herein.

Embodiment II

As another exemplary embodiment, the server may determine that the sender of the object allocation request is the allocation source, and extract data indicating the allocation targets, the notification targets, and the quantity of objects to be allocated specified by the allocation source from the object allocation request. In other words, the allocation source may completely specify in advance all aspects of the allocation targets, the notification targets, and the quantity of objects to be allocated.

Gift Object Notification Configuration Page

Figure 6:
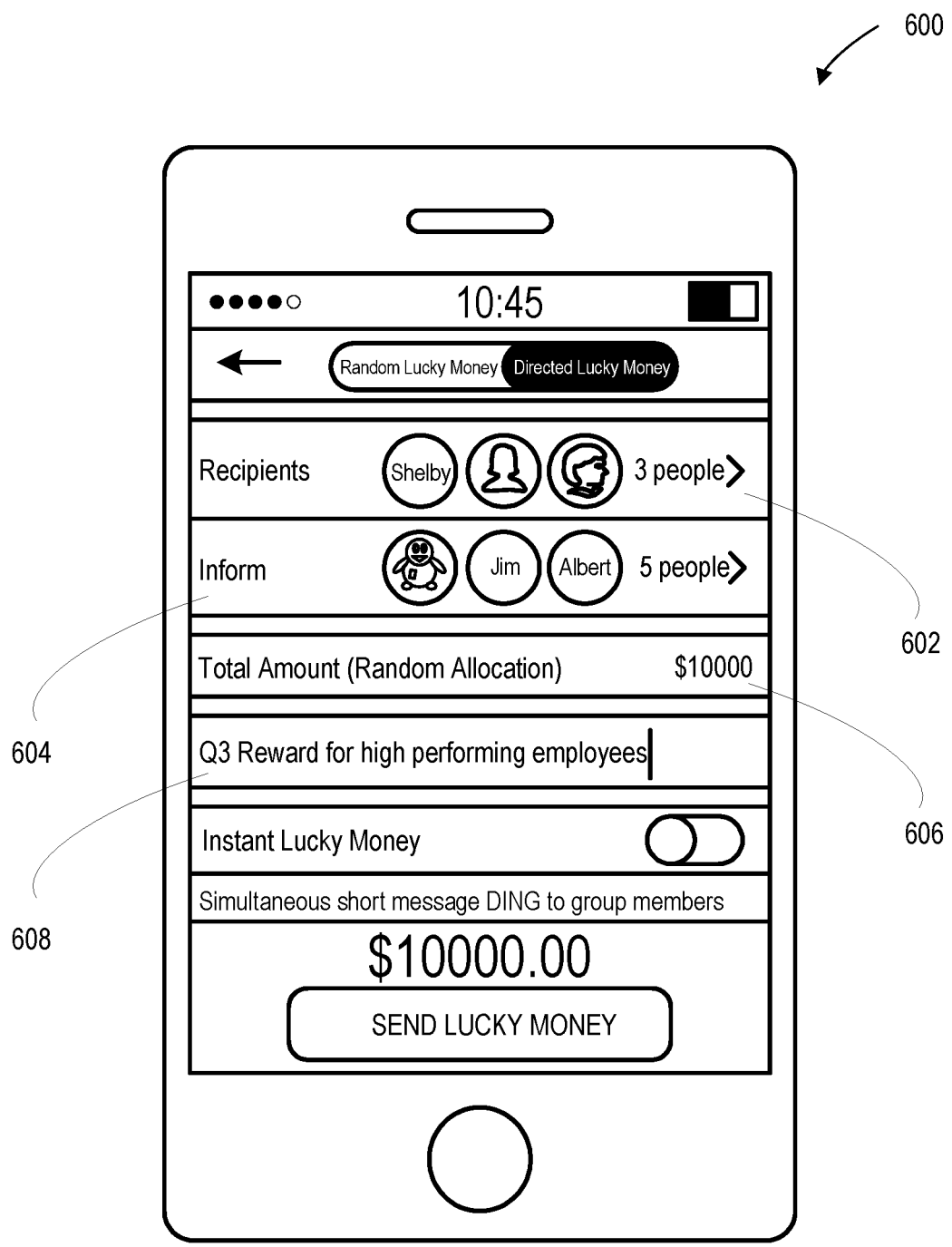
FIG. 6 presents a schematic diagram illustrating an exemplary gift object configuration page, in accordance with an embodiment of the present invention.

FIG. 6 presents a schematic diagram 600 illustrating an exemplary gift object notification configuration page, in accordance with an embodiment of the present invention. As illustrated in FIG. 6, an allocation source may configure recipients 602 using a method similar to the embodiment illustrated in FIG. 5. If the user selects three people, the three people are called the allocation targets. Similar to the configuration method for the recipients, the user may select any group members other than the three selected recipients to be notification targets 604. The notification targets are displayed next to the word "inform" in FIG. 6. For example, as illustrated in FIG. 6, the user may select five people to be notification targets, who might not be all members of the group. In embodiment II, the allocation targets and the notification targets may belong to different groups, and the allocation source may arbitrarily select the notification targets from an address book.

The allocation source may specify the quantity of objects to be allocated on the gift object (which in this example is lucky money) configuration page as illustrated in FIG. 6. For example, the allocation source may specify a number for a configuration form 606 labeled "total amount (random allocation)" displayed in FIG. 6. In FIG. 6 the total amount for random allocation is $10000. FIG. 5 displays an application screen that includes the single amount configuration form, e.g. each of the allocation targets receives an equal quantity of objects to be allocated, which is $3000 as displayed in FIG. 5. In contrast, FIG. 6 displays an application screen that includes the "total amount (random allocation)" configuration form. That is, the system randomly allocates the total amount (e.g., $10,000) to all allocation targets, and the amount received by each allocation target is not fixed.

The single amount illustrated in FIG. 5 and the total amount (random allocation) illustrated in FIG. 6 are configuration forms for the quantity of objects to be allocated. Different embodiments may include each of the different types of configuration forms. For example, the configuration form for the single amount illustrated in FIG. 5 may also be included in the embodiment illustrated in FIG. 6. Configuration form 606 for "total amount (random allocation)" illustrated in FIG. 6 may also be included in the embodiment illustrated in FIG. 5. The allocation source may select a currently used configuration form, or may directly use a default configuration form. Correspondingly, the server may need to perform reasonable allocation for objects to be allocated by using a corresponding object allocation rule in accordance with the configuration form selected by the allocation source. The server may also perform allocation for objects to be allocated in accordance with a default rule corresponding to the default configuration form.

The system may also use other configuration forms. For example, the system may uniformly allocate all of the quantity of objects to be allocated (the final allocation is illustrated in FIG. 5, but the configuration process is different). The system may also separately configure the quantity of objects for each allocation target (e.g., 1000 for user A, 3000 for user B, 5000 for user C). Embodiments of the present invention are not limited to the examples of configuration forms provided herein.

Moreover, as illustrated in FIG. 5 and FIG. 6, on the lucky money configuration page, a user may add a corresponding description 608 when sending the lucky money, such as "Q3 Reward for high-performing employees", in order to differentiate and identify different lucky money instances.

2. Object Allocation—Process for Object Allocation

In operation 208, the system may allocate the objects to be allocated to the allocation targets using various methods. An example of an object allocation method is described below.

Figure 7:
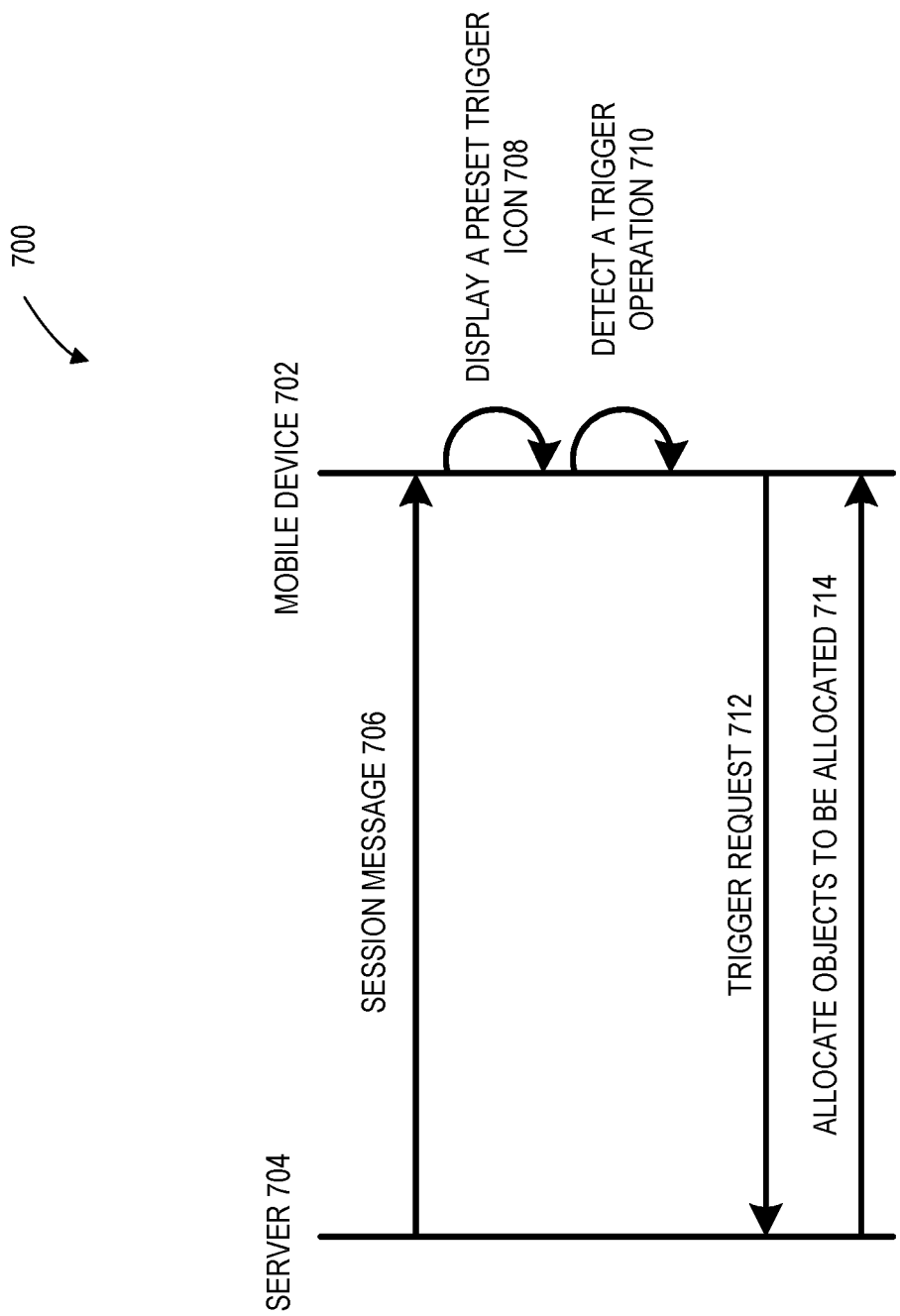
FIG. 7 presents a flowchart illustrating an exemplary process for object allocation, in accordance with an embodiment of the present invention.

FIG. 7 presents a flowchart 700 illustrating an exemplary process for object allocation, in accordance with an embodiment of the present invention. As illustrated in FIG. 7, when an allocation target logs onto a corresponding registered account on a mobile device 702, mobile device 702 and a server 704 may interact according to the following operations:

Server 704 may push a session message to mobile device 702 (operation 706).

Mobile device 702 may display a preset trigger icon according to the received session message (operation 708). A preset trigger icon is an icon that a user may click on to accept, open, and/or view information associated with receiving objects in an allocation operation and/or notification of the allocation operation.

Mobile device 702 may detect a trigger operation (operation 710).

Mobile device 702 may send a trigger request to server 704 according to the detected trigger operation (operation 712).

Server 704 may allocate the objects to be allocated according to the received trigger request (operation 714).

The session message may include data indicating the preset trigger icon, and mobile device 702 may extract the data indicating the preset trigger icon from the session message and display the preset trigger icon on a preset page. Alternatively, the session message is only a notification message which the system may use to notify mobile device 702 to display the preset trigger icon.

For example, FIG. 5 and FIG. 6 each includes user Shelby as a recipient in a lucky money sending scenario. As displayed in FIG. 5 and FIG. 6, an allocation source may select user Shelby as a recipient for lucky money, e.g., user Shelby is an allocation target. User Shelby may be logged onto a registered account on mobile device 702, and the system (e.g., user Shelby's mobile device) may display a message session window for a group labeled "hard-working team" as depicted in FIG. 8.

Message Session Window when Receiving Gift Object

Figure 8:
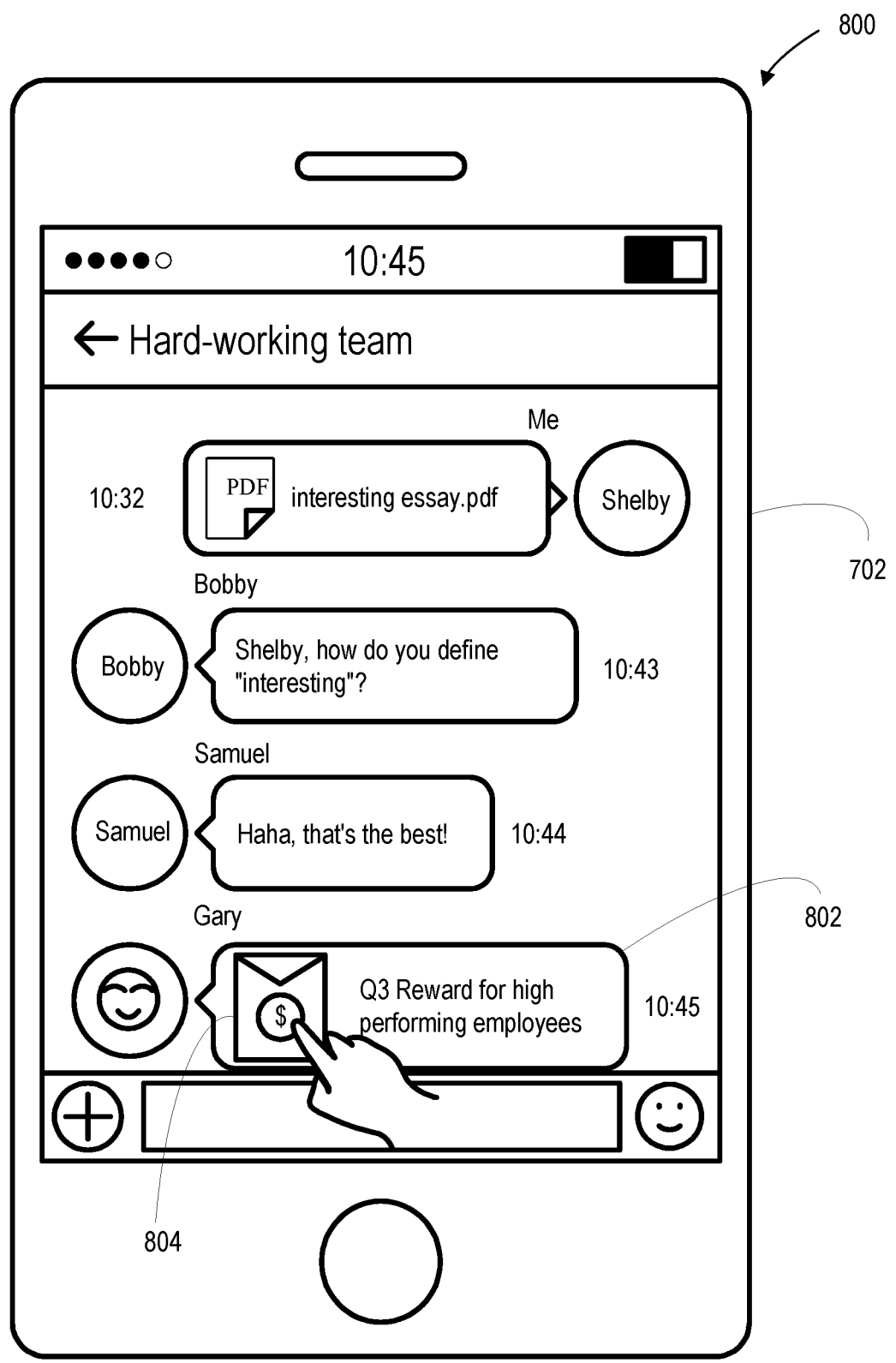
FIG. 8 presents a schematic diagram illustrating an exemplary message session window when receiving gift object, in accordance with an embodiment of the present invention.

FIG. 8 presents a schematic diagram 800 illustrating an exemplary message session window when receiving gift object, in accordance with an embodiment of the present invention. Mobile device 702 (e.g., that user Shelby is logged onto) may display a message session window of a group labeled "hard-working team" as depicted in FIG. 8. As illustrated in FIG. 8, user Shelby may view gift object message 802, which includes a lucky money icon 804, sent by user Gary.

In one embodiment, the preset trigger icon may be lucky money icon 804 displayed in FIG. 8. After user Shelby clicks on lucky money icon 804 displayed in FIG. 8, mobile device 702 may respond to the click as a trigger operation. Mobile device 702 may issue a trigger request to server 704, in order for server 704 to allocate a corresponding amount (e.g. $3000) from the lucky money to user Shelby.

Figure 9:
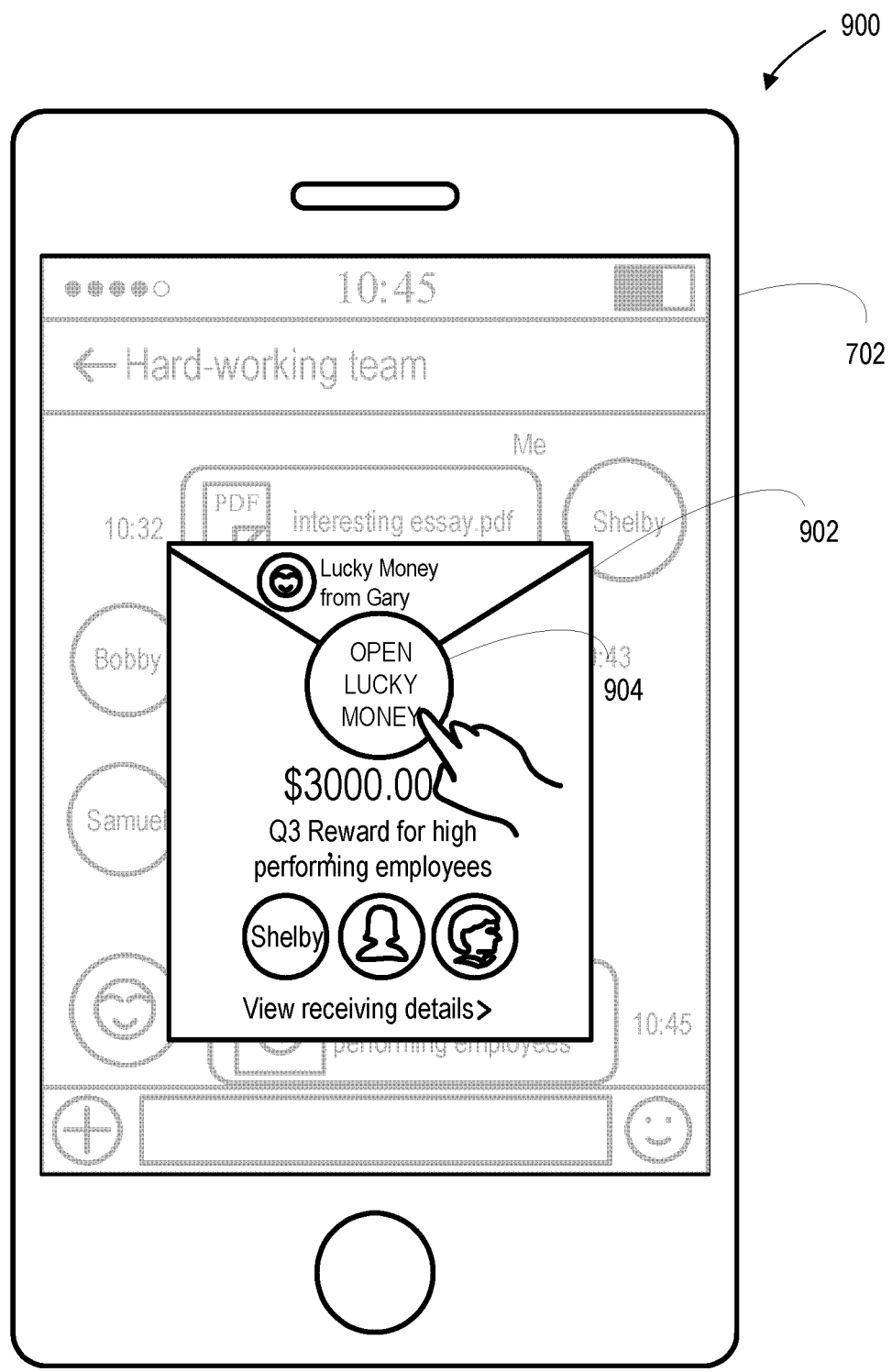
FIG. 9 presents a schematic diagram illustrating exemplary superimposed content when a user receives and views gift object, in accordance with an embodiment of the present invention.

FIG. 9 presents a schematic diagram 900 illustrating exemplary superimposed content when a user receives and views gift object, in accordance with an embodiment of the present invention. After user Shelby clicks on lucky money icon 804 displayed in FIG. 8, the system (e.g. mobile device 702) may superimpose and display content 902 illustrated in FIG. 9 over a current message session window. Examples of preset trigger icons may include the lucky money icon displayed in FIG. 8 and an "Open Lucky Money" icon 904 displayed in FIG. 9. That is, when user Shelby clicks on lucky money icon 804 illustrated in FIG. 8 and clicks on "Open Lucky Money" icon 904 illustrated in FIG. 9, mobile device 702 may respond to the clicks performed by user Shelby as trigger operations. Mobile device 702 may issue a trigger request to server 704, in order for server 704 to allocate a corresponding amount (e.g., $3000) from the lucky money to user Shelby.

In some embodiments, a mobile device may include a text-to-speech converter to read a message from the allocation source to a notification target. The mobile device may also animate icons, including animating an icon using one technique when the mobile device receives a gift object with allocated funds, while animating the same (or different) icon using another, different technique when the mobile device receives only a notification with no allocated funds. In some embodiments, a user may log onto a mobile device using a fingerprint scanner on the mobile device, and the system may determine that the user is an allocation target that is receiving allocated objects. In response to determining that the user is an allocation target, the system may directly display content 902 as illustrated in FIG. 9, thereby speeding up access to the allocated objects. The system may also automatically send a message to the allocation source, server, and/or other group members' mobile devices in response to detecting the user logging in using the fingerprint scanner and displaying content 902. A server may respond to the message by allocating a corresponding amount from a gift object to the user.

Figure 10:
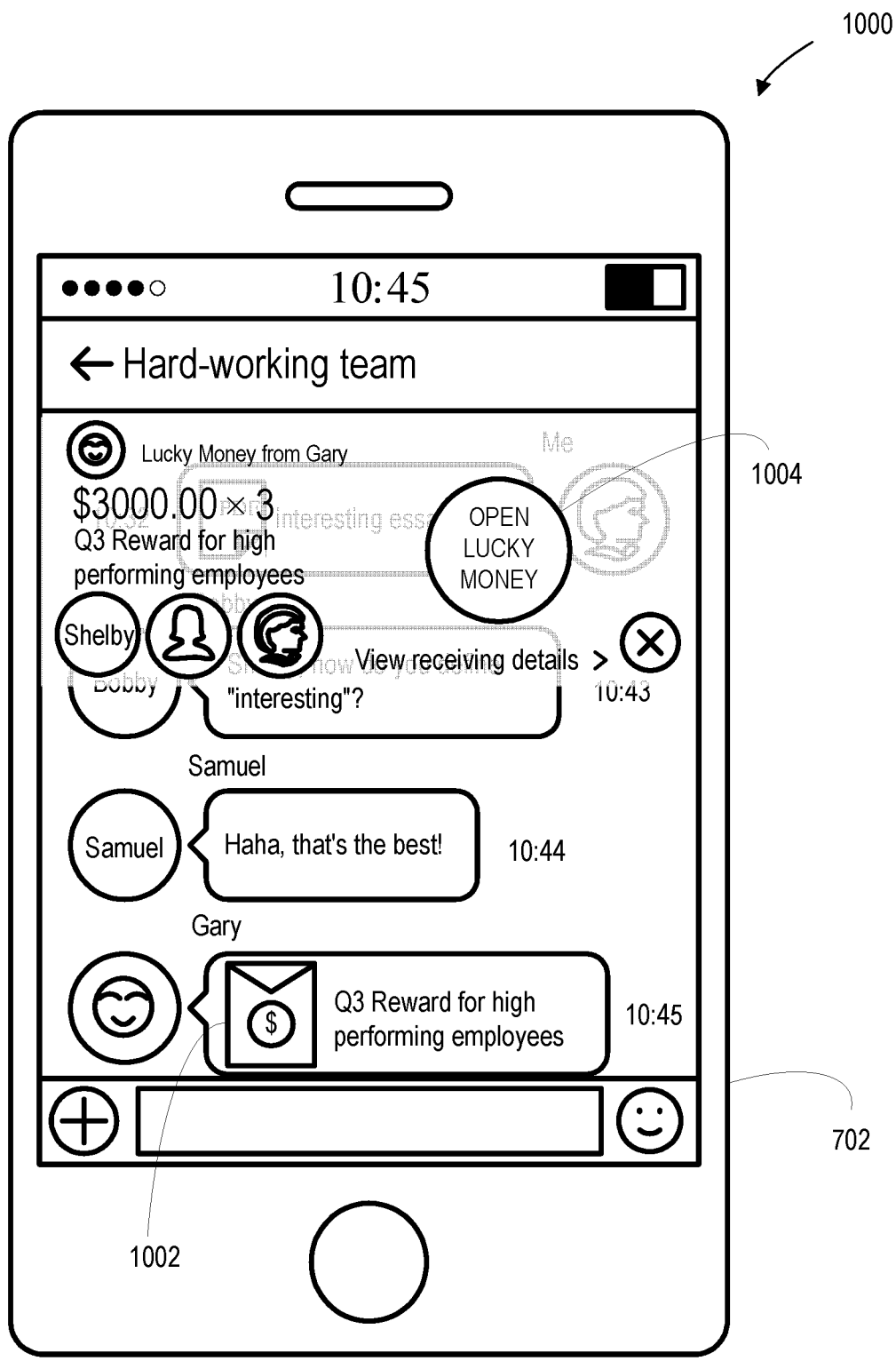
FIG. 10 presents a schematic diagram illustrating an exemplary message session window with a preset trigger icon, in accordance with an embodiment of the present invention.

FIG. 10 presents a schematic diagram 1000 illustrating an exemplary message session window with a preset trigger icon, in accordance with an embodiment of the present invention. Although FIG. 8 and FIG. 9 illustrates exemplary preset trigger icons, the system (e.g. mobile device 702) may display other forms of preset trigger icons. For example, as illustrated in FIG. 10, after user Shelby clicks on lucky money icon 1002, the system may display messages, such as a preset trigger icon "Open Lucky Money" icon 1004, on the top portion of the message session window. User Shelby may subsequently perform operations with mobile device 702 as illustrated and described with respect to FIG. 7.

For the embodiments displayed in FIG. 9 or FIG. 10, mobile device 702 may also display a message prior to displaying the preset trigger icon. For example, the message may indicate that the allocation source is user Gary, list all allocation targets, and indicate that the user may click on "View Receiving Details" to view the details for receiving the lucky money. The message may also display details for receiving the lucky money for each allocation target.

In some embodiments, the system may also display a preset trigger icon, such as lucky money icon 1002, in a sidebar window. The sidebar window may be a lucky money receiving window separately used for receiving lucky money. The system may also display lucky money icon 1002 as a preset trigger icon in an independent session window associated with an enterprise financial account and user Shelby for receiving lucky money.

3. Message Notification

In operation 208, the system may apply different methods to notify notification targets of messages related to the allocation operation. The message notification method is described below using specific examples.

Although the system may allocate objects to be allocated only to the allocation targets without allocating to the notification targets, the system may still notify notification targets of messages related to the allocation operation. This correspondingly encourages the notification targets to work harder. For example, in enterprise management or team management scenarios, one may reward a portion of employees (e.g., allocation targets) with funds or other awards (e.g., objects) directly and provide the reward information to other employees that do not receive the reward (e.g., notification targets). Those employees who are not rewarded may be encouraged to learn more and work harder.

In an embodiment, the server may use a default method to notify the notification targets of messages. Alternatively, the server may also determine the notification method specified by the allocation source in the object allocation request, and notify the notification targets of messages related to the allocation operation in accordance with the notification method. For the server, there are many optional notification methods (e.g., the allocation source may select any of these notification methods), which are described by way of example below.

Message Session Window when Receiving Notification

Figure 11:
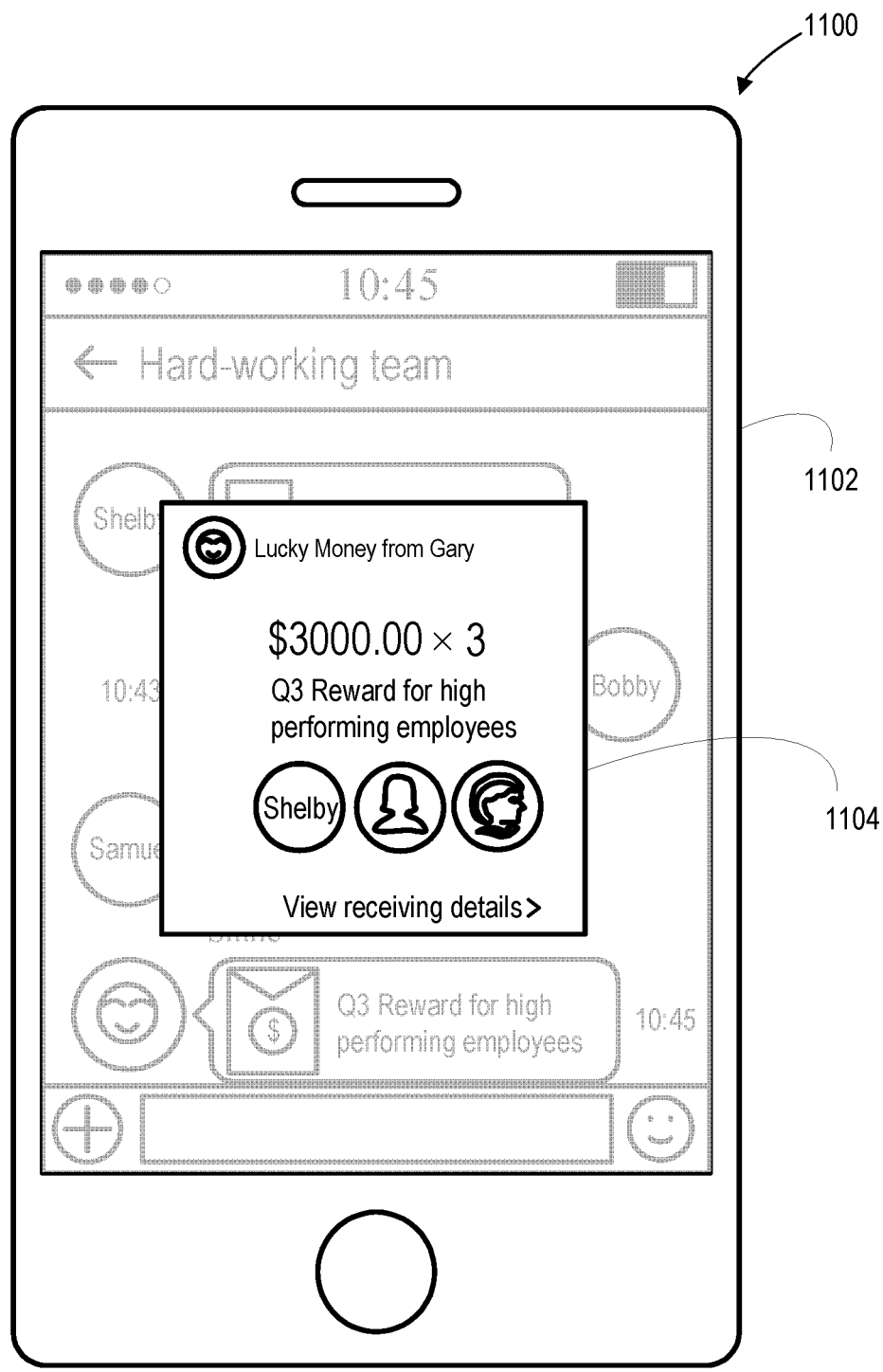
FIG. 11 presents a schematic diagram illustrating an exemplary message session window when receiving a notification, in accordance with an embodiment of the present invention.

FIG. 11 presents a schematic diagram 1100 illustrating an exemplary message session window when receiving a notification, in accordance with an embodiment of the present invention. As illustrated in FIG. 11, the server may send a notification message to an electronic device 1102 that a notification target is logged onto. For example, the notification target may be user Bobby in FIG. 11. Electronic device 1102 may display a preset trigger icon, which is a lucky money icon similar to lucky money icon 804 illustrated in FIG. 8. After user Bobby clicks on the preset trigger icon, the system may display a superimposed page 1104 as illustrated in FIG. 11. From a comparison of FIG. 11 and FIG. 9, on the display screen for user Bobby, only the message related to the allocation operation can be viewed. The message may include at least one of: the allocation source is user Gary, all allocation targets, the quantity of allocated objects, and each allocation target's status associated with receiving objects (e.g., "View Receiving Details" may be clicked on for viewing additional details). Moreover, the screen illustrated in FIG. 11 does not display an "Open Lucky Money" icon, so user Bobby cannot receive an allocation of funds or any other object from the lucky money.

Figure 12:
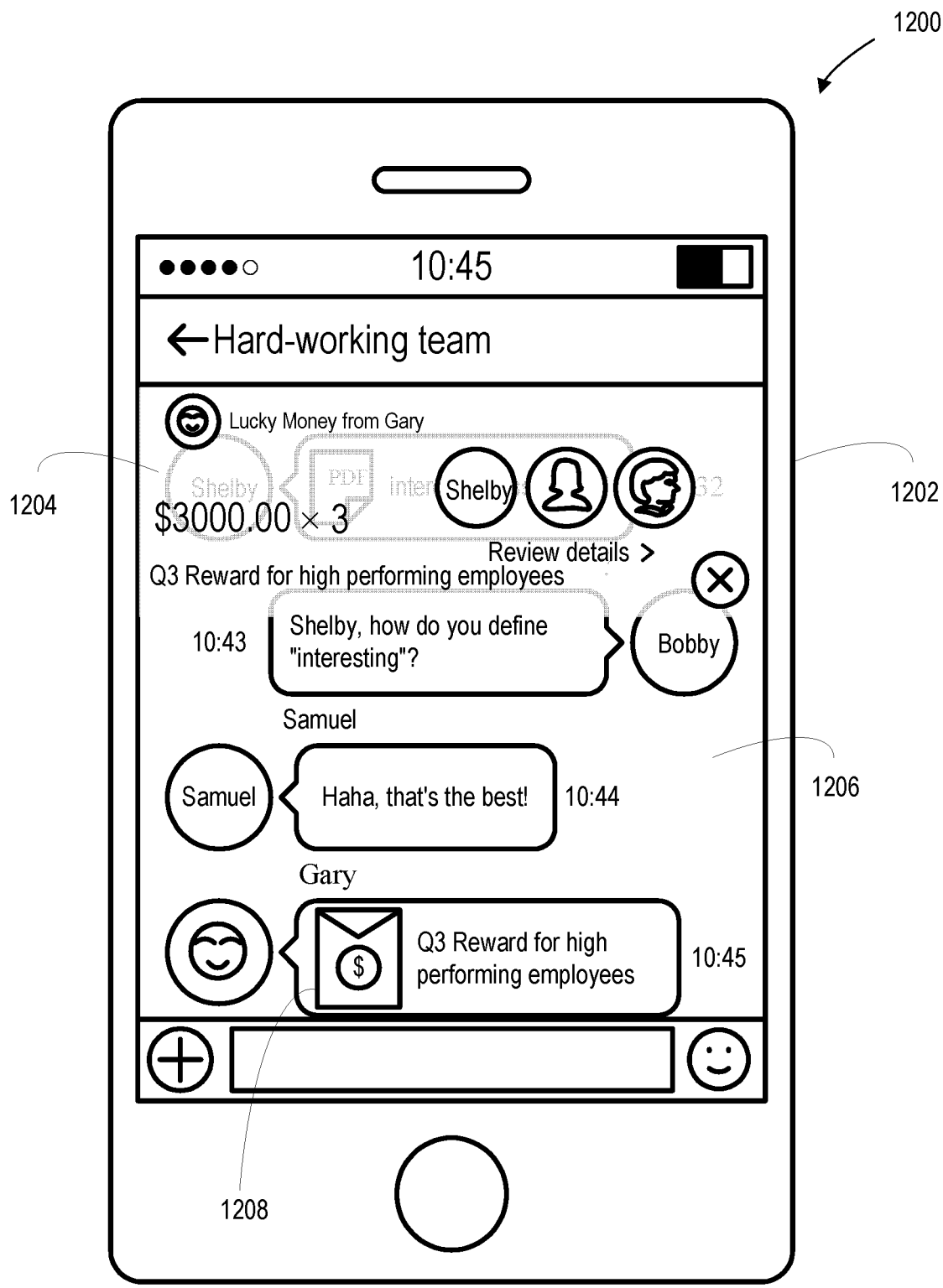
FIG. 12 presents a schematic diagram illustrating another exemplary message session window when receiving notification of gift object without receiving an allocation, in accordance with an embodiment of the present application.

FIG. 12 presents a schematic diagram 1200 illustrating another exemplary message session window when receiving notification of gift object without receiving an allocation, in accordance with an embodiment of the present invention. Similar to FIG. 10, in the embodiment illustrated in FIG. 12, the system (e.g. mobile device 1202) may display a superimposed page 1204 at a top portion of a message session window 1206. However, in FIG. 12 there is no "Open Lucky Money" icon (e.g., such as "Open Lucky Money" icon 1004)

displayed so user Bobby may not receive an allocation of funds or any other reward objects from lucky money.

User Bobby may initially click on a lucky money icon 1208 similar to that illustrated in FIG. 8. The click operation is a predefined trigger operation for displaying a message related to the allocation operation. The predefined trigger operation may also be in other forms. For example, the predefined trigger operation may be an operation for opening a message session window of a group. After mobile device 1202 that user Bobby is logged onto receives a notification message from a server, user Bobby may simply click and enter a message session window of a corresponding group on the electronic device. The system may then automatically display a message related to the allocation operation in one of the formats illustrated in FIG. 11 or FIG. 12. The automatic display guarantees that user Bobby may view the related message immediately, such that user Bobby may view and click on the lucky money icons without needing to scroll through multiple pages manually when there are excessive messages in the group.

Notification and Allocation Communication Methods

If user Gary sends lucky money to the group "hardworking team", the group members may perform operations for receiving the lucky money and viewing messages using a message session window of the group. In some embodiments, the server may display messages related to the allocation operation for the notification targets using a method that does not involve the message session window of the group. For example, the server may send communication information including messages related to the allocation operation to the notification targets using various methods, including instant messages, text messages, and email. The server may also transform a message related to the allocation operation into an audio message, and broadcast the audio message after establishing calls with the notification targets. Alternatively, the server may simultaneously use the various message notification methods disclosed herein to guarantee that the notification targets can receive and view corresponding message content on time. As displayed in FIG. 5 and FIG. 6, if the allocation source selects the instant lucky money control on the lucky money configuration page, the system may perform a message notification operation with respect to "simultaneous short message DING to group members". The "simultaneous short message DING to group members" text display indicates that the system performs message notification by sending a short message. The short message may be a SMS message, which is also referred to as a text message, and may also be a MMS message. Similarly, the allocation source may also select "telephone DING" or "in-application DING" to execute message notification operations using telephone or instant messaging methods.

The system may apply a selected instant lucky money option to an object allocation process, e.g., a lucky money sending process. For example, after the allocation source selects instant lucky money control 510 based on "simultaneous short message DING to group members" illustrated in FIG. 5 or FIG. 6, the server may notify the notification targets via short message. The server may also send short messages to the allocation targets. The short message may describe the details of the lucky money being sent and a method for receiving the lucky money. When the server receives short message replies from the allocation targets according to the indicated lucky money receiving method, the server may allocate the lucky money or other objects to the allocation targets.

Alternatively, after the allocation source selects an instant lucky money control based on "telephone DING", the server may make a phone call over a network to notify the notification targets. The server may call the allocation targets and broadcast details of the lucky money and a method for receiving the lucky money and/or any other allocated objects. The allocation targets may accordingly input a character string via a dial pad of a call interface, or may establish a voice call. After receiving the character string or the voice call, the server may allocate the lucky money or other objects to the allocation targets if the character string or the content of the voice call is consistent with predetermined content.

Short messages and phone calls often are strongly suggestive in comparison to the internal messages of applications such as instant messaging applications. Therefore short messages and phone calls are effective in helping allocation targets to timely receive allocated objects, such as lucky money, and may guarantee timely and effective notification for the notification targets.

Electronic Device

Figure 13:
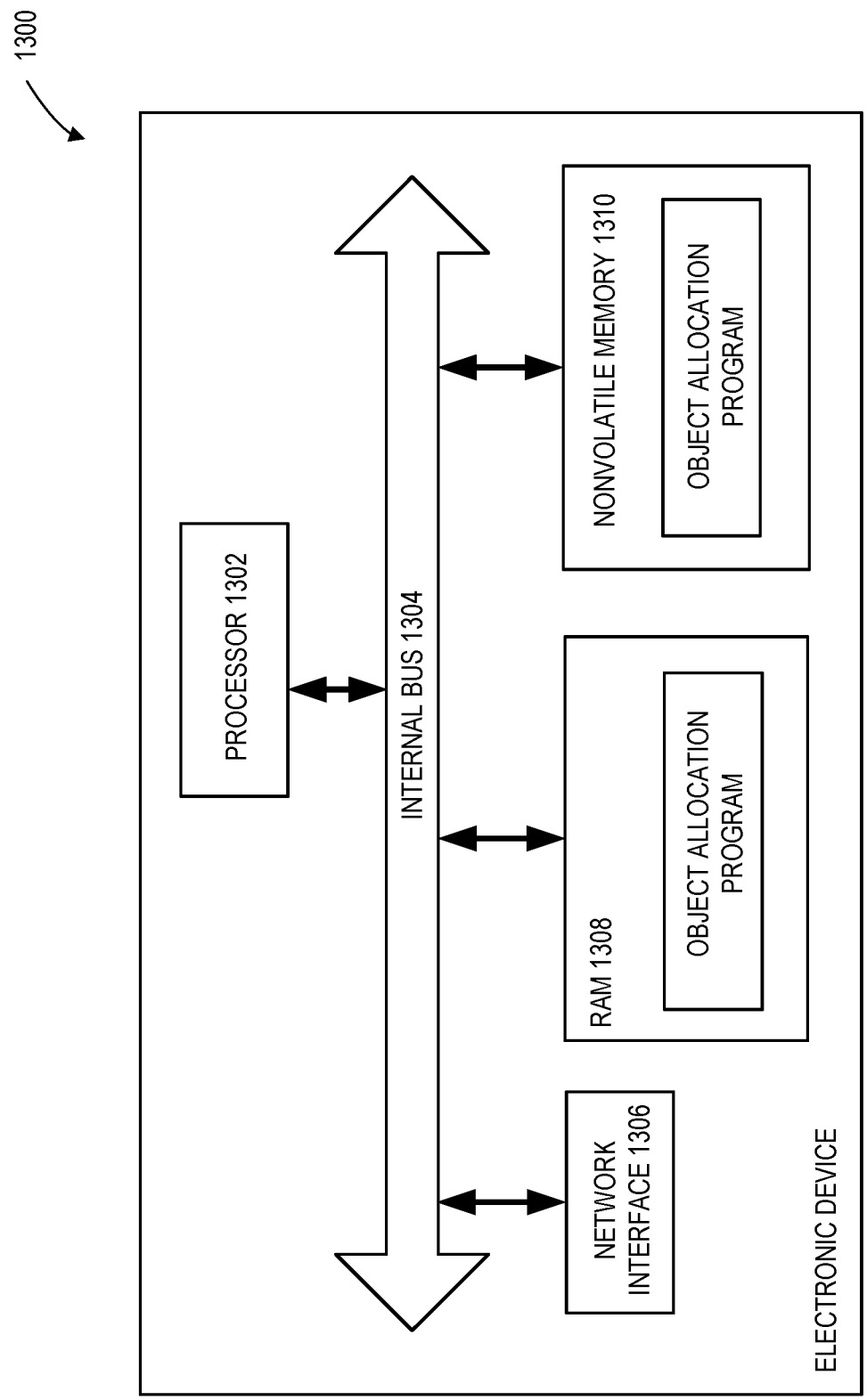
FIG. 13 presents a schematic diagram illustrating an exemplary system architecture of an electronic device for allocating objects among group members, in accordance with an embodiment of the present invention.

FIG. 13 presents a schematic diagram illustrating an exemplary system architecture of an electronic device 1300 for allocating objects among group members, in accordance with an embodiment of the present invention. At the hardware layer, the electronic device may include a processor 1302, an internal bus 1304, a network interface 1306, RAM 1308, and nonvolatile memory 1310. Electronic device 1300 may include other hardware not depicted in the illustration. Processor 1302 may execute an object allocation computer program after reading the object allocation computer program from nonvolatile memory 1310 into RAM 1308. The computer program may perform the processes described herein, which includes allocating objects to allocation targets.

Apparatus for Allocating Objects Among Group Members

Figure 14:
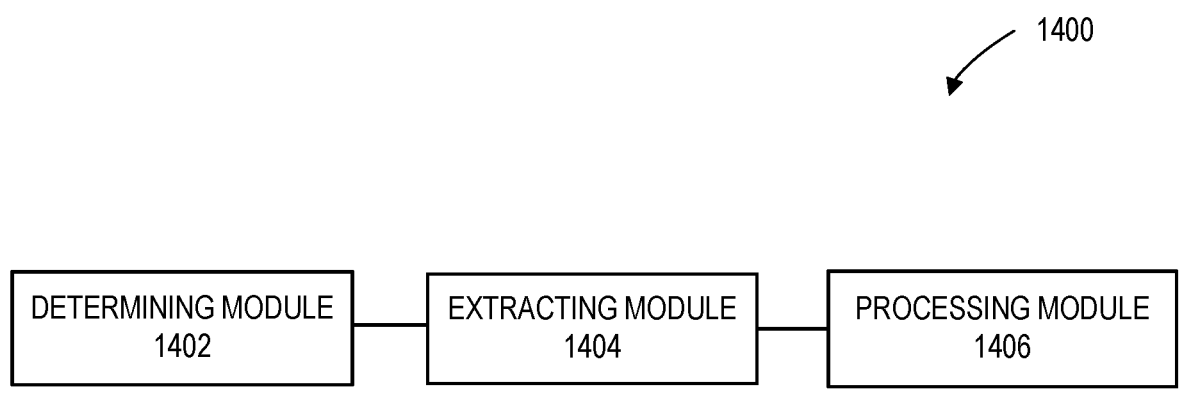
FIG. 14 presents a schematic diagram illustrating an exemplary apparatus for allocating objects among group members, in accordance with an embodiment of the present invention.

FIG. 14 presents a schematic diagram illustrating an exemplary system architecture of an apparatus 1400 for allocating objects among group members, in accordance with an embodiment of the present invention. Apparatus 1400 may include a determining module 1402, an extracting module 1404, and a processing module 1406.

Determining module 1402 may receive an object allocation request, and determine an allocation source, allocation targets, notification targets, and a quantity of objects (e.g., a number of objects) to be allocated based on the received object allocation request.

Extracting module 1404 may extract the objects to be allocated corresponding to the quantity of objects to be allocated from an object set corresponding to the allocation source.

Processing module 1406 may allocate the objects to be allocated to the allocation targets, and notify notification targets of messages related to the allocation operation.

Determining module 1402 may also determine that a sender of the object allocation request is the allocation source. Determining module 1402 may extract data indicating the allocation targets, notification targets, and the quantity of objects to be allocated specified by the allocation source from the object allocation request. When the allocation source sends the object allocation request to a group, the notification targets are members of the group excluding the allocation source and excluding the allocation targets.

In some embodiments, the group is a group in an instant messaging application. Optionally, the instant messaging application is an enterprise instant messaging application. In some embodiments, processing module 1406 allocates the objects to be allocated to the allocation targets by performing operations that include pushing a session message to a computing device that the allocation target is logged onto. The computing device may respond to receiving the session message by displaying a corresponding preset trigger icon.

In response to receiving a preset trigger request sent from the computing device, the system may allocate the objects to be allocated to the allocation target. The preset trigger request may be sent by the computing device in response to detecting that the allocation target performs a trigger operation on a preset trigger icon.

In some embodiments, allocating the objects to be allocated to the allocation targets may include allocating a corresponding quantity of objects to each allocation target according to at least one of a default object allocation rule and an object allocation rule included in an object allocation request.

The object allocation rule may specify at least one of allocating uniformly, allocating randomly, and allocating according to a quantity allocated for each allocation target as specified by the allocation source.

Processing module 1406 may allocate objects to be allocated to the allocation targets by performing operations as described below:

Processing module 1406 may make a phone call to notify the allocation targets. Processing unit 1406 may call the allocation targets and broadcast a method for receiving the objects to be allocated. The allocation targets may input a character string via a call interface, or may establish a voice call. After receiving the character string or the voice call, processing unit 1406 may allocate the objects to be allocated to the allocation targets if the character string or the content of the call voice is consistent with predetermined content.

Processing module 1406 may notify the notification targets of messages related to the allocation operation by extracting data indicating a notification method specified by the allocation source from the object allocation request, and notifying the notification target of messages related to the allocation operation according to the notification method.

Processing module 1406 may notify the notification targets of messages related to the allocation operation by pushing a notification message to a notification target. A computing device that the notification target is logged onto may detect a predefined trigger operation, and display a message related to the allocation operation.

The allocation source, the allocation target, and the notification target may be from a same group, and the predefined trigger operation may include opening a message session window of the group.

Exemplary Embodiments

Embodiments of the present disclosure include a system for performing an allocation operation. During operation, the system may receive an object allocation request from a computing device associated with an allocation source. The system may determine the allocation source, one or more allocation targets, one or more notification targets, and a quantity of objects to be allocated based on the object allocation request. The system may extract objects to be allocated corresponding to the quantity of objects to be allocated from an object set corresponding to the allocation source. The system may allocate the objects to be allocated to the allocation targets. The system may then notify the notification targets of messages related to the allocation operation.

In a variation on this embodiment, determining the allocation source, the allocation targets, the notification targets, and the quantity of objects to be allocated based on the received object allocation request includes determining that a sender of the object allocation request is the allocation source. The system may also extract data indicating the allocation targets, notification targets, and the quantity of objects to be allocated specified by the allocation source from the object allocation request.

In a variation on this embodiment, determining the allocation source, the allocation targets, the notification targets, and the quantity of objects to be allocated based on the received object allocation request includes determining that a sender of the object allocation request is the allocation source. The system may then extract data indicating the allocation targets and the quantity of objects to be allocated from the object allocation request. The allocation source may send the object allocation request to a group, and the notification targets are members of the group excluding the allocation source and excluding the allocation targets.

In a variation on this embodiment, the group is a group in an instant messaging application.

In a further variation, the instant messaging application is an enterprise instant messaging application.

In a variation on this embodiment, allocating the objects to be allocated to the allocation targets includes pushing a session message to a second computing device that an allocation target is logged onto. The second computing device may respond to receiving the session message by displaying a preset trigger icon. In response to receiving a preset trigger request sent from the second computing device, the system may allocate the objects to be allocated to the allocation target. Note that the preset trigger request is sent by the second computing device in response to detecting that the allocation target performs a trigger operation on the preset trigger icon.

In a variation on this embodiment, allocating the objects to be allocated to the allocation targets includes allocating a corresponding quantity of objects to each allocation target according to at least one of a default object allocation rule and a particular object allocation rule included in the object allocation request.

In a further variation, the particular object allocation rule included in the object allocation request specifies at least one of allocating uniformly, allocating randomly, and allocating according to a quantity allocated for each allocation target as specified by the allocation source.

In a variation on this embodiment, allocating the objects to be allocated to the allocation targets includes establishing voice calls with the allocation targets over a network and broadcasting a method for receiving allocated objects. A particular allocation target may perform at least one of inputting a character string via a call interface and establishing a voice call. In response to receiving at least one of the character string and the voice call, the system may determine that the character string or a content of the voice call is consistent with a predetermined content, and allocate the objects to be allocated to the particular allocation target.

In a variation on this embodiment, notifying the notification targets of messages related to the allocation operation includes extracting data indicating a notification method specified by the allocation source from the object allocation request. The system may then notify the notification targets of messages related to the allocation operation according to the notification method.

In a variation on this embodiment, notifying the notification targets of messages related to the allocation operation includes pushing a notification message to a computing device that a particular notification target is logged onto. The computing device may detect a predefined trigger operation, and displays a message related to the allocation operation in response to detecting the predefined trigger operation.

In a further variation, the allocation source, the allocation targets, and the notification targets are members of a group, and the predefined trigger operation includes the computing device receiving user input opening a message session window of the group.

Embodiments of the present disclosure may also include a computer-implemented method for communication in an instant messaging group having multiple members. During operation, the system may display, at a computing device of a user, a graphical user interface having at least a first gift object mode option and a second gift object mode option. The first gift object mode option is selectable by the user to send a first-type gift object message to a group-chat window so that each member of the instant messaging group has an opportunity to obtain at least message portion of the gift object. The second gift object mode option is selectable by the user to send a second-type gift object message to the group-chat window so that only those members designated by the second-type gift object message can receive the gift object or a portion thereof.

The system may receive user input to select the second gift object mode option. The system may receive user selection of one or more members to each receive at least a portion of the second-type gift object. The system may then receive user input indicating a quantity of objects to be allocated to each of the selected members. The system may then extract from an object set the objects to be allocated corresponding to the user defined quantity, and allocate the objects to the selected members.

Exemplary Server

Figure 15:
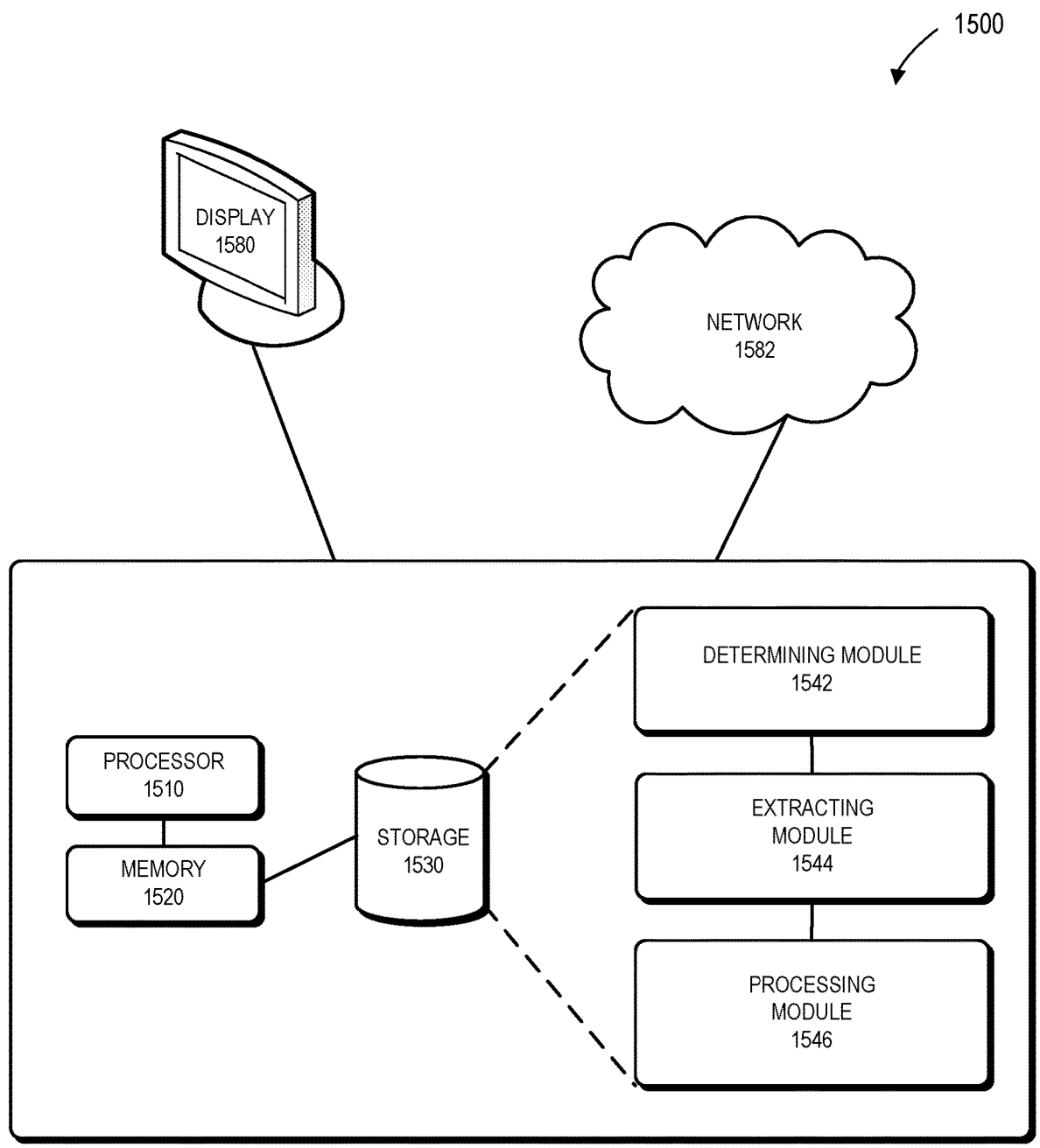
FIG. 15 presents a schematic diagram illustrating an exemplary server for allocating objects among group members, in accordance with an embodiment of the present application.

FIG. 15 presents a schematic diagram illustrating an exemplary server 1500 for allocating objects among group members, in accordance with an embodiment of the present application. Server 1500 may include a processor 1510, a memory 1520, and a storage device 1530. Storage 1530 typically stores instructions that can be loaded into memory 1520 and executed by processor 1510 to perform the methods described above. In one embodiment, the instructions in storage 1530 can implement a determining module 1542, an extracting module 1544, and a processing module 1546 which can communicate with each other through various means.

In some embodiments, modules 1542-1546 can be partially or entirely implemented in hardware and can be part of processor 1510. Further, in some embodiments, the server may not include a separate processor and memory. Instead, in addition to performing their specific tasks, modules 1542-1546, either separately or in concert, may be part of special-purpose computation engines.

Storage 1530 stores programs to be executed by processor 1510. Specifically, storage 1530 stores a program that implements a server (e.g., application) for allocating objects among group members. During operation, the application program can be loaded from storage 1530 into memory 1520 and executed by processor 1510. As a result, server 1500 can perform the functions described above. Server 1500 can further include an optional display 1580, and can be coupled via one or more network interfaces to a network 1582.

Determining module 1542 may receive an object allocation request, and determine an allocation source, allocation targets, notification targets, and a quantity of objects (e.g., a number of objects) to be allocated based on the object allocation request.

Extracting module 1544 may extract the objects to be allocated corresponding to the quantity of objects to be allocated from an object set corresponding to the allocation source.

Processing module 1546 may allocate the objects to be allocated to the allocation targets, and notify notification targets of messages related to the allocation operation.

Embodiments of the present invention may be implemented on various universal or dedicated computer system environments or configurations. For example, the computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module may include a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for performing an allocation operation, comprising:
   receiving a gift object allocation request from a first computing device of a user, wherein the user comprises an allocation source;
   determining the allocation source, one or more allocation targets, one or more notification targets to whom no gift objects are to be allocated based on the allocation request, and a quantity of gift objects to be allocated based on the gift object allocation request,
   wherein the allocation source sends the gift object allocation request for a group in an instant messaging application,
   wherein members of the group include the allocation source, first members which are the allocation targets, and second members which are the notification targets, wherein the notification targets comprise a subset of the members of the group which are not allocation targets,
   wherein the allocation source selects the first members and the second members from among the group;
   extracting gift objects to be allocated corresponding to the quantity of gift objects to be allocated from a gift object set corresponding to the gift object allocation request by the allocation source;
   allocating the gift objects to be allocated to the allocation targets; and
   notifying, via the instant messaging application, the first members and the second members of the group of the allocation of the gift objects in a gift object message from the allocation source, wherein notifying the second members comprises:
       displaying, on a screen of a second computing device executing the instant message application and associated with a notification target, a first preset trigger icon; and
       in response to receiving a user action associated with the first preset trigger icon, displaying on the screen of the second computing device a superimposed message over a current message window, wherein the superimposed message indicates the allocation source, the allocation targets, and the quantity of the allocated gift objects.

2. The method of claim 1, wherein determining the allocation source, the allocation targets, the notification targets, and the quantity of gift objects to be allocated based on the gift object allocation request comprises:
   determining that a sender of the gift object allocation request is the allocation source; and
   extracting data indicating the allocation targets, the notification targets, and the quantity of gift objects to be allocated specified by the allocation source from the gift object allocation request.

3. The method of claim 1, wherein determining the allocation source, the allocation targets, the notification targets, and the quantity of gift objects to be allocated based on the gift object allocation request comprises:
   determining that a sender of the gift object allocation request is the allocation source; and
   extracting data indicating the allocation targets and the quantity of gift objects to be allocated from the gift object allocation request;
   wherein the notification targets are members of the group excluding the allocation source and excluding the allocation targets.

4. The method of claim 1, wherein allocating the gift objects to be allocated to the allocation targets comprises:
   pushing a session message to a third computing device that an allocation target is logged onto, wherein the third computing device responds to receiving the session message by displaying a second preset trigger icon; and
   in response to receiving a preset trigger request sent from the third computing device, allocating the gift objects to be allocated to the allocation target, wherein the preset trigger request is sent by the third computing device in response to detecting that the allocation target performs a trigger operation on the second preset trigger icon.

5. The method of claim 1, wherein allocating the gift objects to be allocated to the allocation targets comprises:
   allocating a corresponding quantity of gift objects to each allocation target according to at least one of a default object allocation rule and a particular object allocation rule included in the gift object allocation request.

6. The method of claim 5, wherein the particular object allocation rule included in the gift object allocation request specifies at least one of allocating uniformly, allocating randomly, and allocating according to a quantity allocated for each allocation target as specified by the allocation source.

7. The method of claim 1, wherein allocating the gift objects to be allocated to the allocation targets comprises:
   establishing voice calls with the allocation targets and broadcasting a method for receiving allocated gift objects, wherein a particular allocation target performs at least one of inputting a character string via a call interface and establishing a voice call; and
   in response to receiving at least one of the character string and the voice call, determining that the character string or a content of the voice call is consistent with a predetermined content, and allocating the gift objects to be allocated to the particular allocation target.

8. The method of claim 1, wherein notifying the second members further comprises:
   extracting data indicating a notification method specified by the allocation source from the gift object allocation request; and
   notifying the notification targets of messages related to the allocation operation according to the notification method.

9. The method of claim 1, wherein notifying the second members further comprises:
   pushing a notification message to a fourth computing device that a particular notification target is logged onto,
   wherein the fourth computing device detects a predefined trigger operation, and displays a message related to the allocation operation in response to detecting the predefined trigger operation.

10. The method of claim 9, wherein the predefined trigger operation includes the computing device receiving user input opening a message session window of the group.

11. A computing system comprising:
    one or more processors; and
    a non-transitory computer-readable medium coupled to the one or more processors storing instructions stored that, when executed by the one or more processors, cause the computing system to perform a method for an allocation operation, the method comprising:

receiving a gift object allocation request from a first computing device of a user, wherein the user comprises an allocation source;

determining the allocation source, one or more allocation targets, one or more notification targets to whom no gift objects are to be allocated based on the allocation request, and a quantity of gift objects to be allocated based on the gift object allocation request, wherein the allocation source sends the gift object allocation request for a group in an instant messaging application, wherein members of the group include the allocation source, first members which are the allocation targets, and second members which are the notification targets, wherein the notification targets comprise a subset of the members of the group which are not allocation targets, wherein the allocation source selects the first members and the second members from among the group;

extracting gift objects to be allocated corresponding to the quantity of gift objects to be allocated from a gift object set corresponding to the gift object allocation request by the allocation source;

allocating the gift objects to be allocated to the allocation targets; and notifying, via the instant messaging application, the first members and the second members of the group of the allocation of the gift objects in a gift object message from the allocation source, wherein notifying the second members comprises:

displaying, on a screen of a second computing device executing the instant messaging application and associated with a notification target, a first preset trigger icons; and in response to receiving a user action associated with the first preset trigger icon, displaying on the screen of the second computing device a superimposed message over a current message window, wherein the superimposed message indicates the allocation source, the allocation targets, and the quantity of the allocated gift objects.

12. The system of claim 11, wherein determining the allocation source, the allocation targets, the notification targets, and the quantity of gift objects to be allocated based on the gift object allocation request comprises:

determining that a sender of the gift object allocation request is the allocation source; and extracting data indicating the allocation targets, the notification targets, and the quantity of gift objects to be allocated specified by the allocation source from the gift object allocation request.

13. The system of claim 11, wherein determining the allocation source, the allocation targets, the notification targets, and the quantity of gift objects to be allocated based on the gift object allocation request comprises:

determining that a sender of the gift object allocation request is the allocation source; and extracting data indicating the allocation targets and the quantity of gift objects to be allocated from the gift object allocation request;

wherein the notification targets are members of the group excluding the allocation source and excluding the allocation targets.

14. The system of claim 11, wherein allocating the gift objects to be allocated to the allocation targets comprises:

pushing a session message to a third computing device that an allocation target is logged onto, wherein the third computing device responds to receiving the session message by displaying a second preset trigger icon; and in response to receiving a preset trigger request sent from the third computing device, allocating the gift objects to be allocated to the allocation target, wherein the preset trigger request is sent by the third computing device in response to detecting that the allocation target performs a trigger operation on the second preset trigger icon.

15. The system of claim 11, wherein allocating the gift objects to be allocated to the allocation targets comprises:

allocating a corresponding quantity of gift objects to each allocation target according to at least one of a default object allocation rule and a particular object allocation rule included in the gift object allocation request.

16. The system of claim 15, wherein the particular object allocation rule included in the gift object allocation request specifies at least one of allocating uniformly, allocating randomly, and allocating according to a quantity allocated for each allocation target as specified by the allocation source.

17. The system of claim 11, wherein allocating the gift objects to be allocated to the allocation targets comprises:

establishing voice calls with the allocation targets over a network and broadcasting a method for receiving allocated gift objects, wherein a particular allocation target performs at least one of inputting a character string via a call interface and establishing a voice call; and in response to receiving at least one of the character string and the voice call, determining that the character string or a content of the voice call is consistent with a predetermined content, and allocating the gift objects to be allocated to the particular allocation target.

18. The system of claim 11, wherein notifying the second members further comprises:

extracting data indicating a notification method specified by the allocation source from the gift object allocation request; and notifying the notification targets of messages related to the allocation operation according to the notification method.

19. A non-transitory computer-readable storage medium storing instructions that when executed by a computer cause the computer to perform a method for performing an allocation operation, the method comprising:

receiving a gift object allocation request from a first computing device of a user, wherein the user comprises an allocation source;

determining the allocation source, one or more allocation targets, one or more notification targets to whom no gift objects are to be allocated based on the allocation request, and a quantity of gift objects to be allocated based on the gift object allocation request, wherein the allocation source sends the gift object allocation request for a group in an instant messaging application, wherein members of the group include the allocation source, first members which are the allocation targets, and second members which are the notification targets, wherein the notification targets comprise a subset of the members of the group which are not allocation targets, wherein the allocation source selects the first members and the second members from among the group;

extracting gift objects to be allocated corresponding to the quantity of gift objects to be allocated from a gift object set corresponding to the gift object allocation request by the allocation source;

allocating the gift objects to be allocated to the allocation targets; and notifying, via the instant messaging application, the first members and the second members of the group of the allocation of the gift objects in a gift object message from the allocation source, wherein notifying the second members comprises:

displaying, on a screen of a second computing device executing the instant messaging application and associated with a notification target, a first preset trigger icon; and in response to receiving a user action associated with the first preset trigger icon, displaying on the screen of the second computing device a superimposed message over a current message window, wherein the superimposed message indicates the allocation source, the allocation targets, and the quantity of the allocated gift objects.

20. A computer-implemented method for communication in an instant messaging group having multiple members, the method comprising:

displaying, at a first computing device of a user, a graphical user interface having at least a first lucky money mode option and a second lucky money mode option, wherein the first lucky money Triode option is selectable by the user to send a first-type lucky money message to a group-chat window so that each member of the instant messaging group has an opportunity to obtain at least a gift object associated with the first-type lucky money message, wherein the second lucky money mode option is selectable by the user to send a second-type lucky money message to the group-chat window so that only a first set of the members can obtain one or more gift objects associated with the second-type lucky money message, wherein the first set of the members comprises one or more members predefined with the second-type lucky money message, and wherein a second set of the members comprises one or more members who are not predefined with the second-type lucky money message;

receiving user input to select the second lucky money mode option;

receiving user selection of the first set of the members to each receive one or more gift objects associated with the second-type lucky money message;

receiving user input indicating a quantity of gift objects to be allocated to each of the selected first set of the members;

extracting gift objects to be allocated corresponding to the quantity of gift objects to be allocated from a gift object set corresponding to the user;

allocating the gift objects to be allocated to the one or more members of the first set; and notifying, in the instant messaging group, the first set of the members and the second set of the members of the allocation of the gift objects in a gift object message from the allocation source, wherein notifying the second set of the members comprises:

displaying, on a screen of a second computing device executing in the instant messaging group and associated with a member of the second set, a preset trigger icon; and in response to receiving a user action associated with the preset trigger icon, displaying on the screen of the second computing device a superimposed message over a current message window, wherein the superimposed message indicates the user, the first set of the members, and the quantity of the allocated gift objects.

\* \* \* \* \*